United States Patent [19]

Takahata et al.

[11] Patent Number: 4,783,779

[45] Date of Patent: Nov. 8, 1988

[54] FREQUENCY ASSIGNMENT SYSTEM IN FDMA COMMUNICATION SYSTEM

[75] Inventors: Fumio Takahata; Mitsuo Nohara; Yasuo Hirata, all of Tokyo, Japan

[73] Assignee: Kokusai Denshin Denwa Co., Ltd., Tokyo, Japan

[21] Appl. No.: 917,572

[22] Filed: Oct. 10, 1986

[51] Int. Cl.⁴ .......................... H04J 1/04; H01J 9/38
[52] U.S. Cl. .................... 370/69.1; 370/118; 455/17
[58] Field of Search .............. 370/69.1, 120, 121, 370/124, 104, 118; 455/17; 379/97, 98

[56] References Cited

U.S. PATENT DOCUMENTS

| 3,283,249 | 11/1966 | Mitchell | 455/17 |
| 3,411,088 | 11/1988 | Hutchison | 435/17 |
| 4,145,575 | 3/1979 | Shida et al. | 370/121 |
| 4,577,312 | 3/1986 | Nash | 370/118 |

FOREIGN PATENT DOCUMENTS 1194001  8/1965  Fed. Rep. of Germany ...... 370/121

OTHER PUBLICATIONS

"Satellite Communications Technology", K. Miya et al., *KDD Engineering and Consulting, Inc.*, 1981, pp. 266-273.

*Primary Examiner*—Robert L. Griffin
*Assistant Examiner*—Andrew J. Telesz, Jr.
*Attorney, Agent, or Firm*—Armstrong, Nikaido, Marmelstein & Kubovcik

[57] ABSTRACT

In a frequency division multiple access (FDMA) communication system, a plurality of carrier frequencies relating to a predetermined frequency band for transmitting a PSK (phase shift keying) signal are provided on a frequency scale. When a service is a low bit rate signal, it is transmitted by using a single carrier frequency and its related frequency band. When a service is a high bit rate signal which can not be transmitted in a single carrier signal, the service signal is divided in to a plurality of low bit rate PSK signals, each of which is transmitted by using a single carrier frequency and the related frequency band.

5 Claims, 30 Drawing Sheets

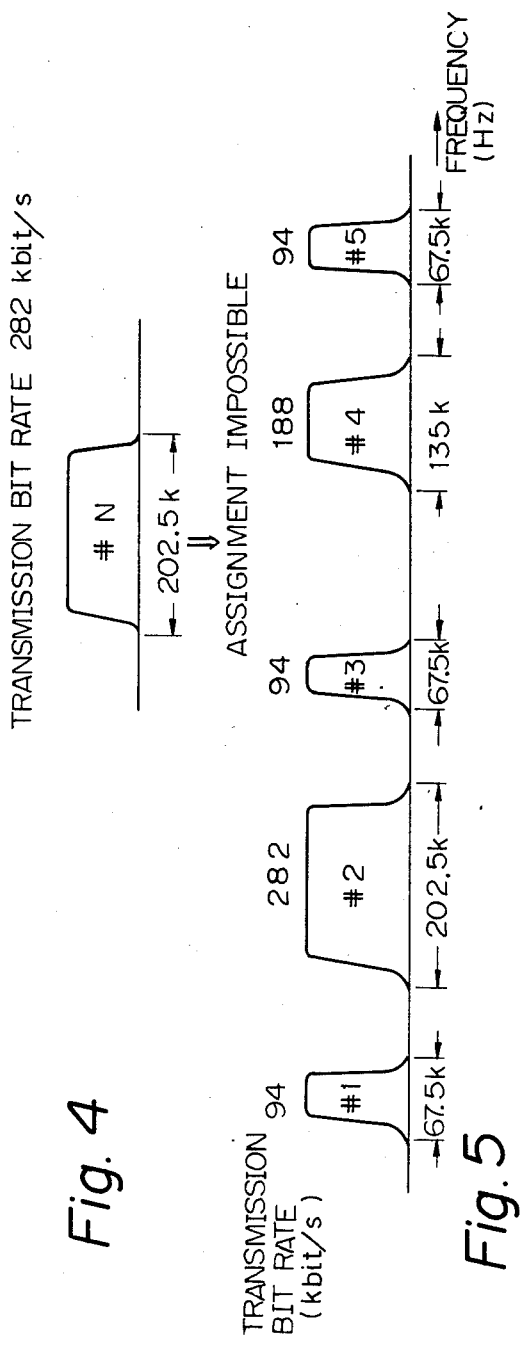
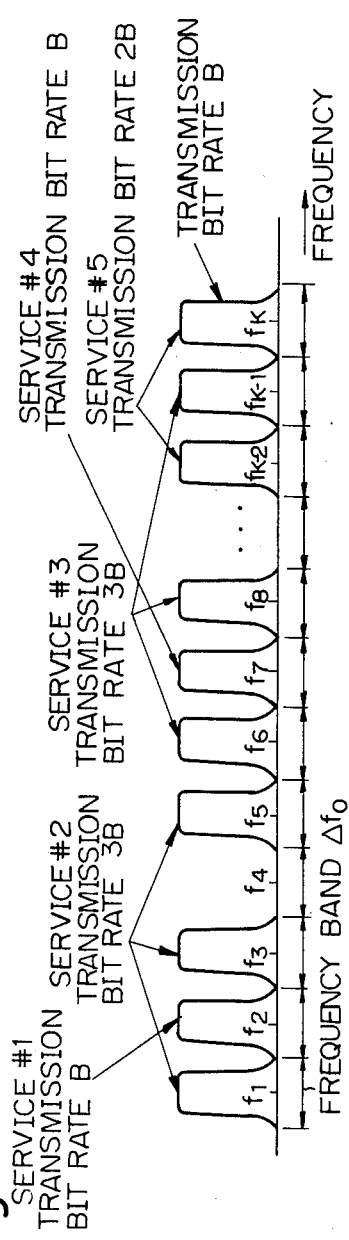

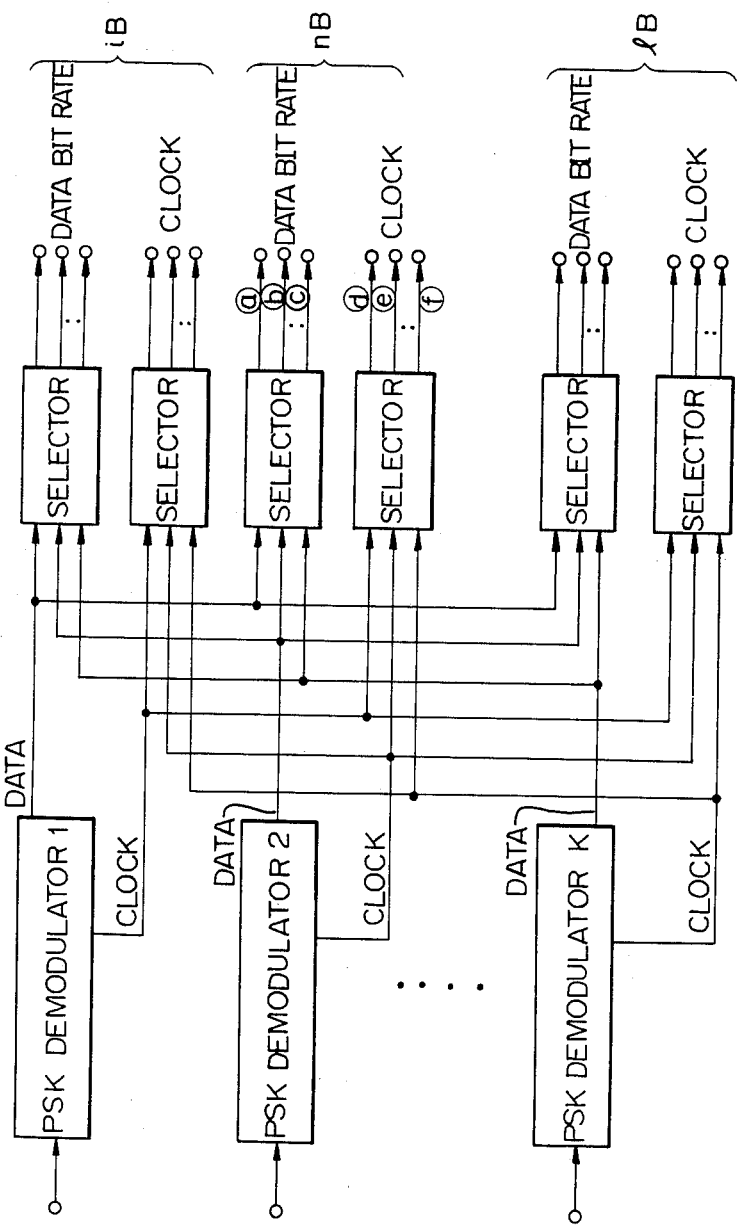

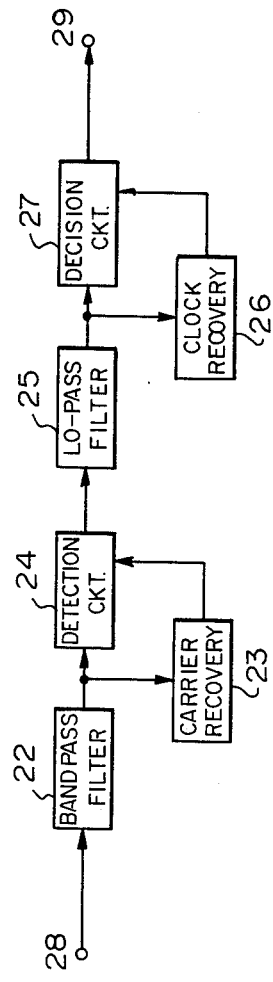
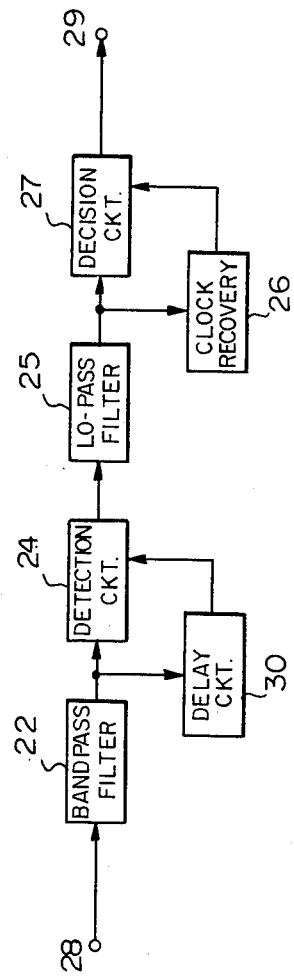

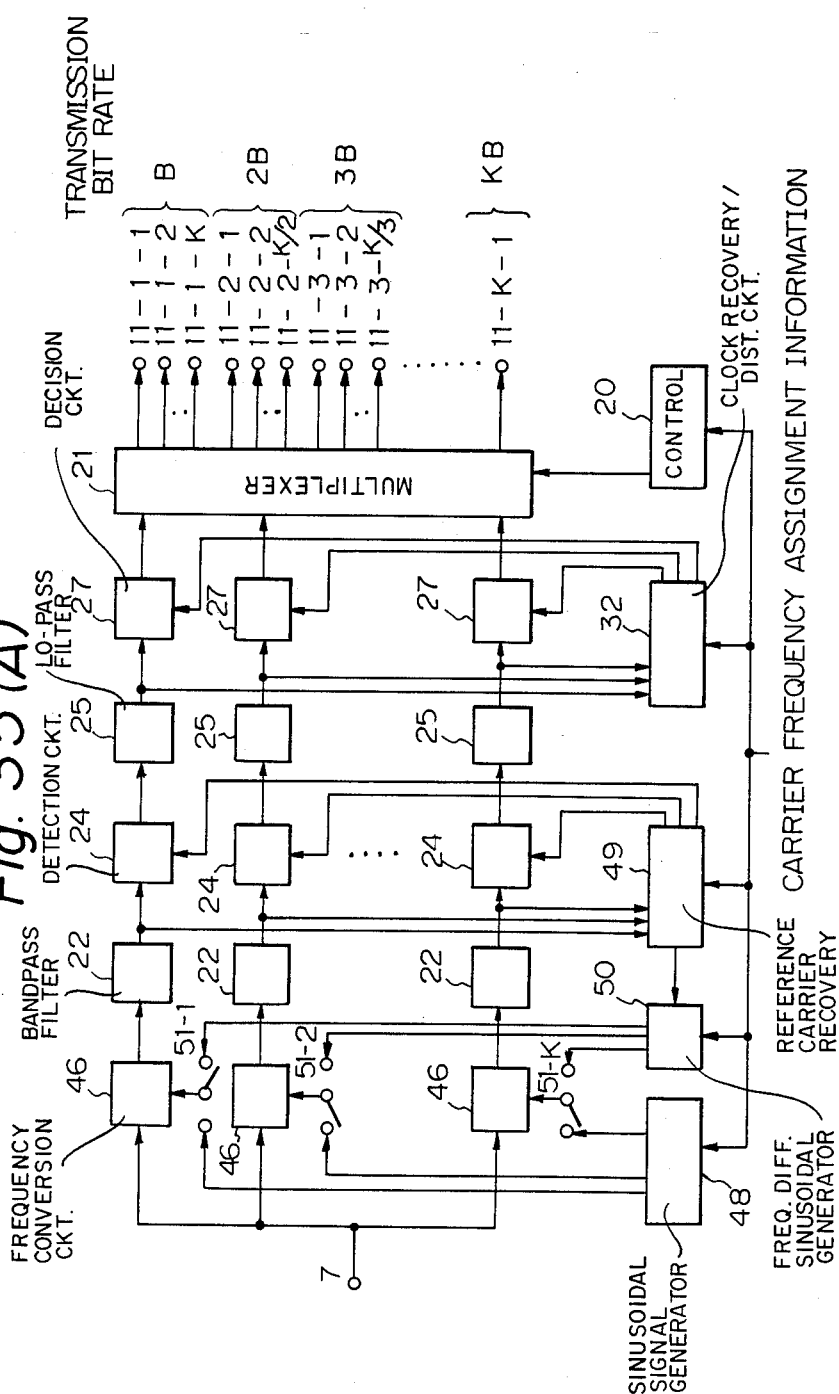

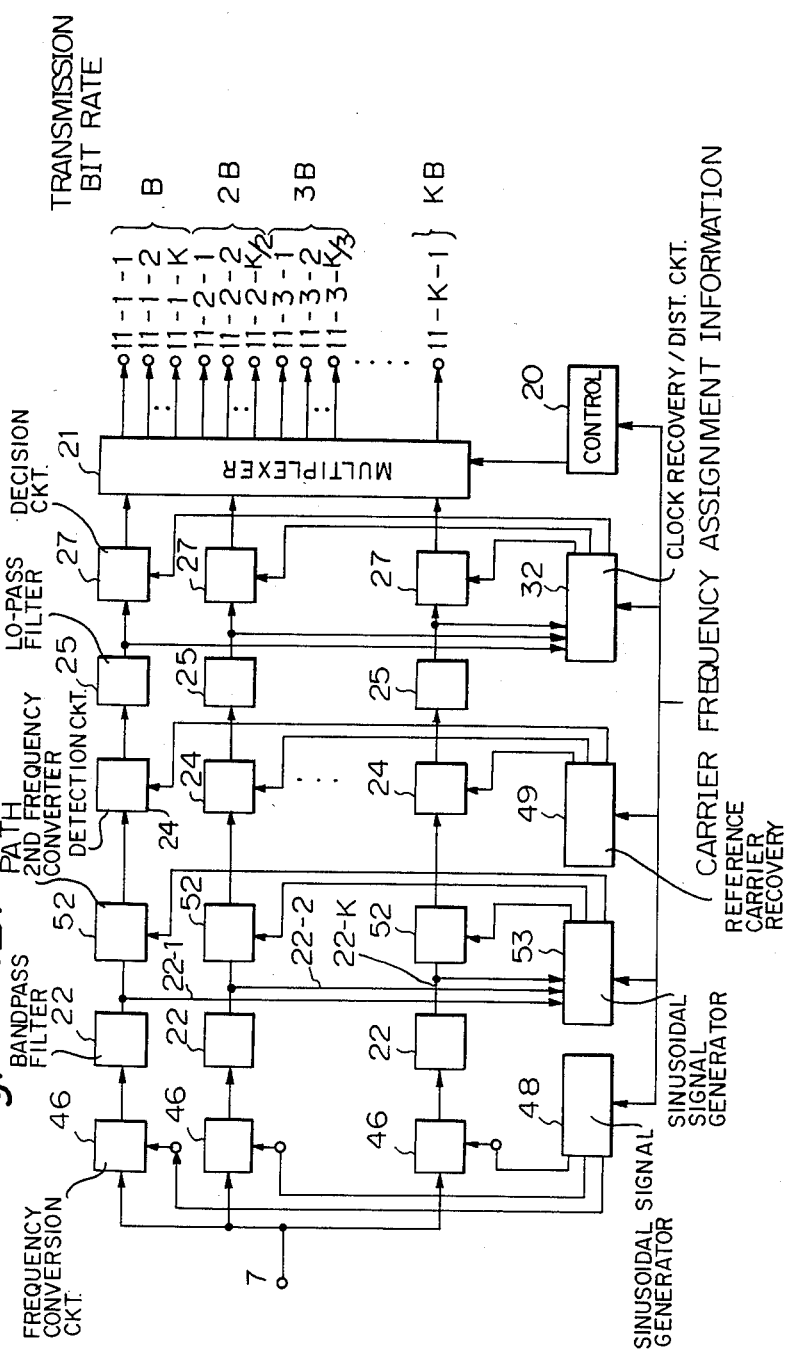

PHASE ERROR CORRECTION CIRCUIT

Fig. 36

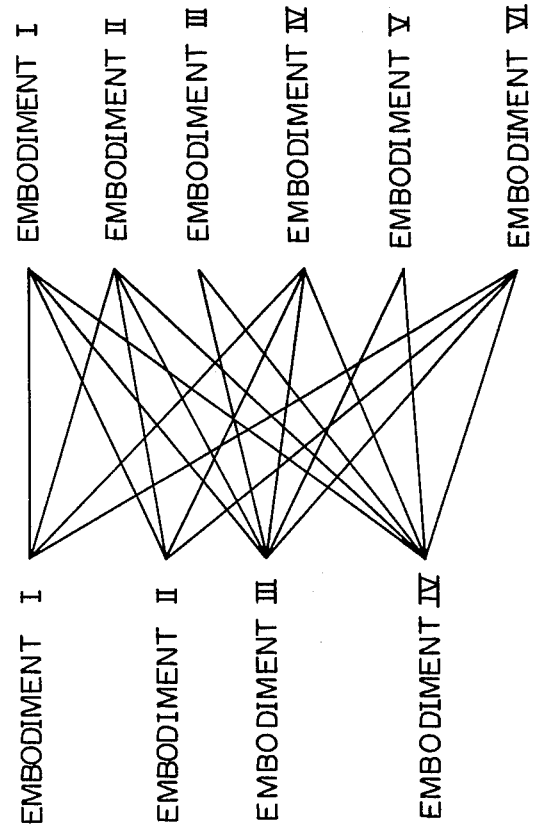

FREQUENCY ASSIGNMENT SYSTEM IN FDMA COMMUNICATION SYSTEM

BACKGROUND OF THE INVENTION

The present invention relates to a carrier frequency assignment system in a frequency division multiple access (FDMA) communication system.

A SPADE (Single channel per carrier PCM multiple Access Demand assignment Equiqment) system has been used in the INTELSAT for international communication. In that system, each PCM signal is modulated through PSK (Phase Shift Keying), and the modulated signal is assigned to a signal carrier frequency which is prepared on a frequency axis, pased on a demand or call basis.

FIG. 2 shows the frequency allocation in SPADE system. The frequencies are not pre-assigned to each earth station, but are shared commonly with all the earth stations which are included in the communication system, and when a satellite channel is requested, a carrier frequency (CH-3 through CH-399, or CH-3' through CH-399') is assigned. Each earth station can assign channels independently by the distributed control method. The SPADE system is advantageous when the number of earth stations is large, and the number of channels for each earth station is small.

Further, an FDMA system is expected to be adopted as a subscriber part in a future regenerative satellite communication system, in which an exchanger and a modem are installed on board the satellite.

In the systems described above, a single frequency band is assigned to each service with an unique transmission bit rate.

However, a plurality of transmission bit rate services will be required in the future because of the demand of a variety of services. A multiple bit rate of 64 kbit/s and/or sub-multiple bit rate of said 64 kbit/s which has been used in PCM transmission system might be required. Further, because of the adoption of various error correction techniques, a transmission bit rate would not solely depend upon service bit rate, but it would also depend upon error correction system.

In the INTELSAT business satellite communication system which accommodates a plurality of services, a frequency band continuous on the frequency scale is assigned to each service. FIG. 3 shows the example of frequency assignment in which the error correction with the coding rate of ¾ and the 4 phase PSK modulation are applied. In the figure, the service with the information bit rate of 64 kbit/s is transferred to a PSK signal with the transmission bit rate of 94 kbit/s after the error correction with the coding rate of ¾ and some necessary synchronization bits are attached. Similarly, the information bit rate 192 kbit/s is changed to the transmission bit rate 282 kbit/s, and 128 kbit/s changed to 188 kbit/s. The frequency bands for those transmission bit rates are 67.5 kHz, 202.5 kHz, and 135 kHz, respectively. Namely, a narrow frequency band is assigned to a low bit rate channel, and a wide frequency band is assigned to a high bit rate channel.

The continuous frequency assignment as shown in FIG. 3 has no problem only when a number of required channels is small and there is a surplus transmission band. However, as shown in FIG. 4, when the frequencies #1 through #5 have been assigned, and the #N high bit rate channel is required to be assigned, that #N frequency cannot be assigned, although the total of unused frequency bands is larger than the band which is necessary for assigning the #N channel. The reason is that the unused frequency bands are not continuous on the frequency scale.

That kind of problem, in which a channel can not be assigned even when the total of unused frequency bands is larger than the necessary band width, because the unused frequency bands are not continuous, will increase in future in proportion to the increase of traffic volume. In that situation, the system efficiency would be decreased considerably.

SUMMARY OF THE INVENTION

It is an object, therefore, of the present invention to overcome the disadvantages and constrains of a frequency pre-assignment system by providing a new and improved frequency assignment system.

The above and other objects are attained by a frequency assignment system in FDMA communication system in which necessary frequency band is assigned upon request having the steps of preparing a plurality of carrier frequencies each having a predetermined transmission band in a communication system; separating a transmission bit rate of each service to a bit rate which can be transmitted in said predetermined transmission band; a single carrier frequency being assigned to a low bit rate service; and a plurality of carrier frequencies being assigned to a high bit rate service.

BRIEF DESCRIPTION OF THE DRAWINGS

The foregoing and other objects, features, and attendant advantages of the present invention will be appreciated as the same become better understood by means of the following description and accompanying drawings wherein;

FIG. 4 is an example of frequency assignment, FIG. 5 is an example of frequency assignment according to the present invention, FIG. 13 shows a block diagram for providing signal with transmission bit rate B to PSK modulators, FIG. 24 is a block diagram of a PSK demodulator based on coherent detection, FIG. 25 is a PSK demodulator based on differential detection, FIG. 35A is a block diagram of fifth embodiment of receive side, FIG. 35B is a block diagram of fifth embodiment of receive side taking account of frequency drift on transmission path, FIG. 36 is a block diagram of sixth embodiment of a receive side, and FIG. 37 shows the combination of embodiments in recieve and transmit sides.

DESCRIPTION OF THE PREFERRED EMBODIMENTS

Figure 1:
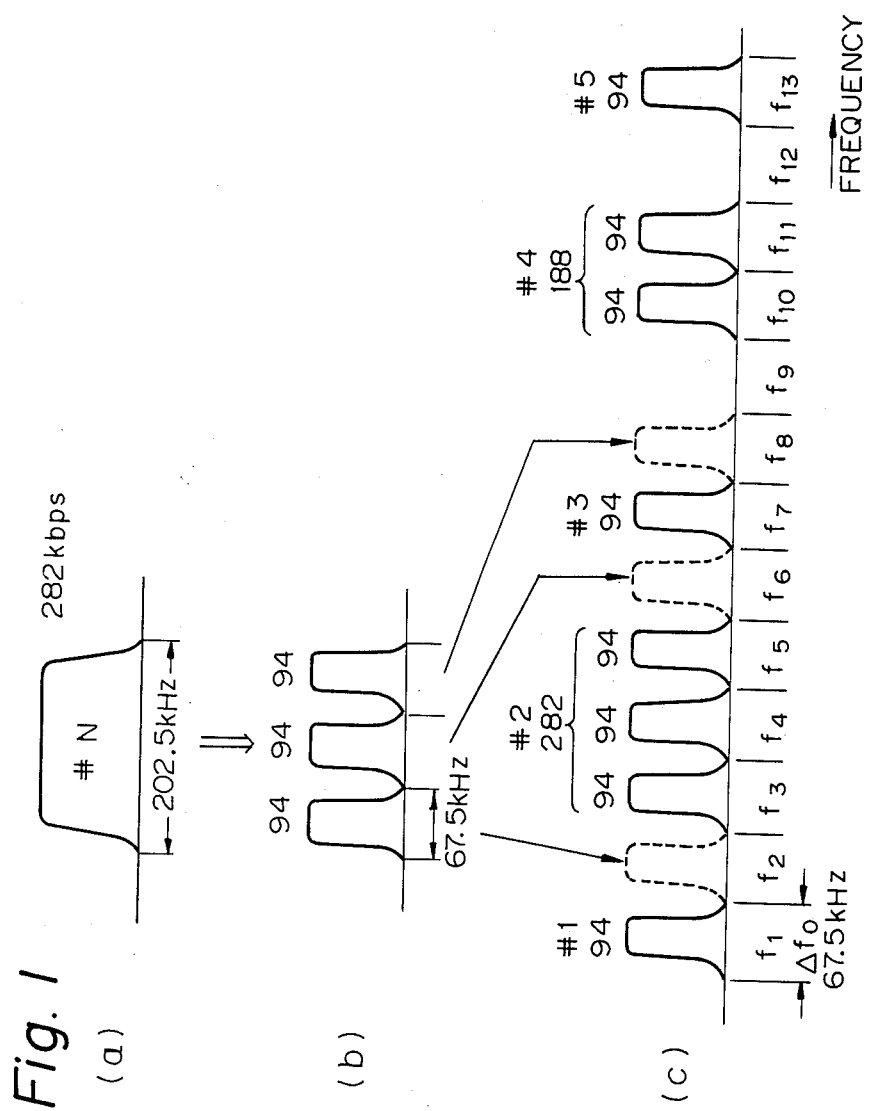
FIGS. 1(a), (b), and (c) show frequency assignment of the present invention.
Figure 2:
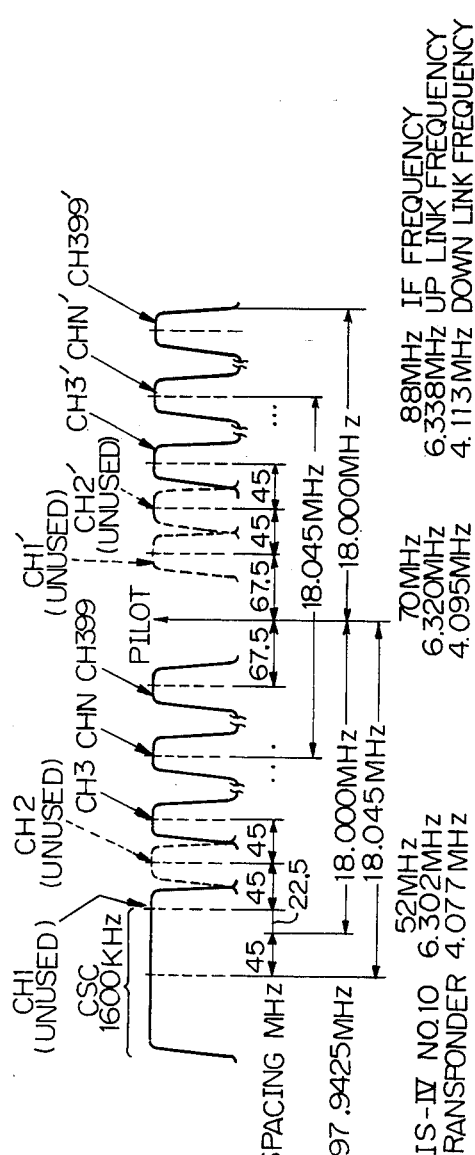
FIG. 2 is an example of frequency allocation in frequency division multiple access system which is used in the INTELSAT SPADE system.
Figure 3:
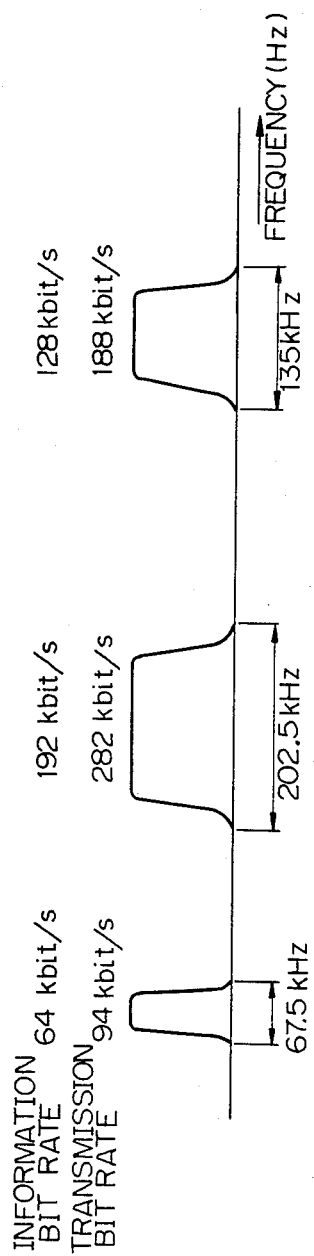
FIG. 3 is a frequency pre-assignment which is used in the INTELSAT business satellite communication system.

FIG. 1 shows the embodiment of the frequency assignment according to the present invention. In the embodiment, it is assumed that a channel with the transmission bit rate of 94 Kbps is a basic unit, and the frequency band of the system is divided by the transmission band of 67.5 KHz which is necessary for transmission of said transmission bit rate 94 kbps, and the carrier frequencies $f_1 \sim f_{13} \sim f_k$ are allocated on the frequency scale. It is also assumed that the service #1, #3, and #5 each having the transmission bit rate 94 Kbps have been allocated to the carrier frequencies $f_1$, $f_7$ and $f_{13}$, the service #2 of 282 Kbps has been allocated to $f_3$, $f_4$ and $f_5$, and further, the service #4 of 188 Kbps has been allocated to $f_{10}$ and $f_{11}$, as shown in FIG. 1(C).

When the service #N of 282 Kbps (FIG. 1(A)) is to be asigned in the above situation, the service #N is divided to three channels each having the transmission bit rate 94 Kbps as shown in FIG. 1(B), since 282 Kbps is higher than 94 Kbps. And, the carrier frequencies $f_2$, $f_6$ and $f_8$ of FIG. 1(C) are assigned to those three channels.

Next, a configuration of a transmit and a receive side which can be used in the present invention is described.

The frequency allocation of FIG. 5 which follows the frequency allocation of FIG. 1 is taken in the following description. In FIG. 5, a predetermined number of carrier frequencies $f_n$ (n=1,2,, , K) with equal frequency band $\Delta f_0$ are provided in the frequency band of the system, and a plurality of carrier frequencies are assigned to a high bit rate service. It is also assumed that each carrier frequency can transmit a PSK signal with the fixed bit rate (transmission bit rate is B), and any service has an integer multiple transmission bit rate of B. Further, each channel is assumed to be modulated through PSK (phase shift keying) system.

Therefore, a transmit side must divide a high transmission bit rate service into a plurality of basic bit rate channels, and a receive side must multiplex said plurality of basic bit rate channels to a high bit rate service. A configuration of a transmit and receive side is described now.

(Embodiment 1 of the transmit side)

Figure 6:
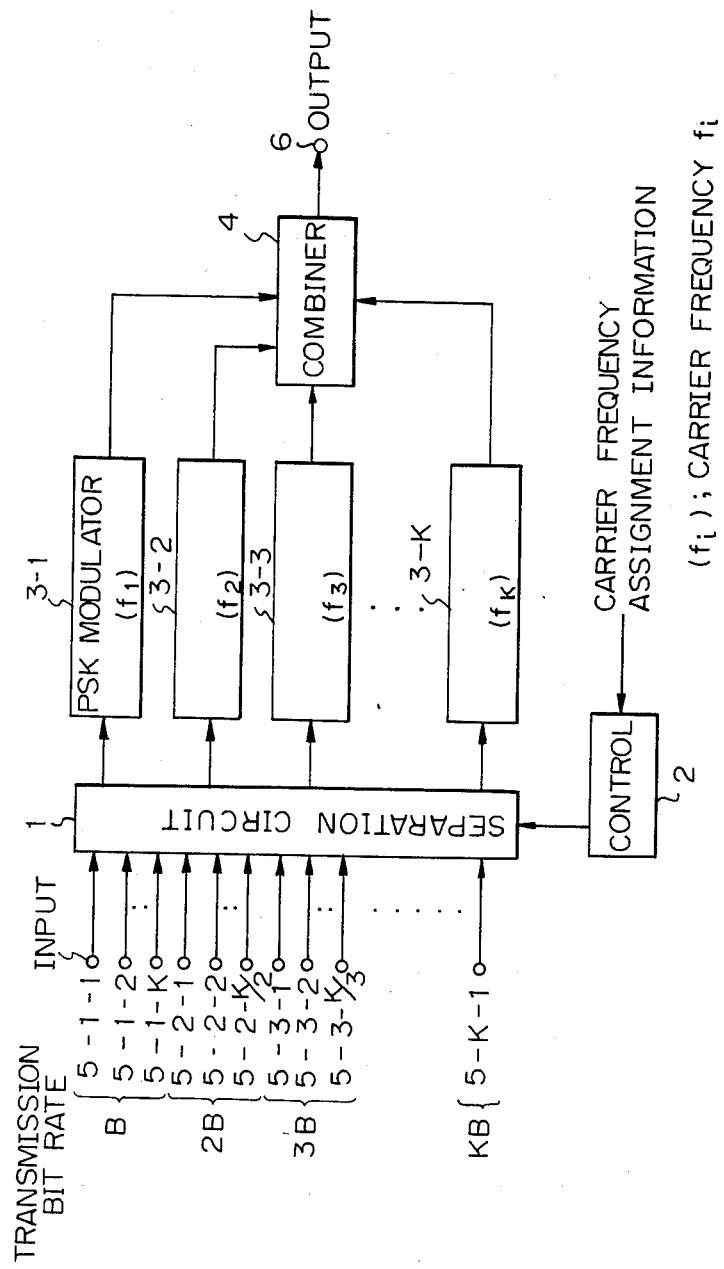
FIG. 6 is a first embodiment of a transmit side.

FIG. 6 shows a block diagram of the first embodiment in the transmit side according to the present invention. In the figure, the numeral 1 is a separation circuit, 2 is a control circuit for controlling said separation circuit 1 according to the carrier frequency assignment information, 3-1 through 3-K are PSK modulators with carrier frequencies of $f_1$ through $f_K$, 4 is a combiner, 5-1-1 through 5-1-K are input ports which interface with the services of the transmission bit rate B, 5-2-1 through 5-2-K/2 are input ports which interface with the service of the transmission bit rate 2B, 5-K-1 is an input port which interfaces with the service of the transmission bit rate KB, and 6 is an output port of the transmit side. The number of input ports for each service depends upon the requency schedule, in other words, it depends upon how many channels are established simultaneously. The present embodiment assumes that the transmission bit rate of each carrier frequency $f_1$ through $f_K$ is B (fixed value), any carrier frequency $f_1$ through $f_K$ can be used, and the service transmission bit rate up to KB can be totally established.

Figure 7:
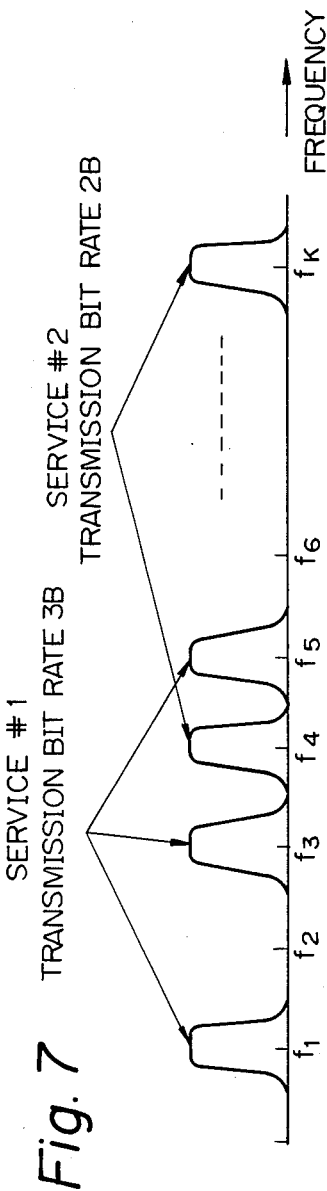
FIG. 7 is an embodiment of frequency assignment, FIGS. 8(a), (b), (c) and (d) show separation of input signal with transmisson bit rate 3B.

For instance, it is assumed that the service #1 of the transmission bit rate 3B is applied to the input port 5-3-1, the service #2 of the transmission bit rate 2B is applied to the input port 5-2-1, and the frequencies ($f_1$, $f_3$, $f_5$), and ($f_4$, $f_K$) are assigned to those services as shown in FIG. 7.

In that case, the signal (FIG. 8a) at the input port 5-3-1 is divided to three signals each having the transmission bit rate B as shown in FIGS. 8b, 8c and 8d, by the separation circuit 1 which is controlled by the control circuit 2. And the divided signals are applied to the PSK modulators 3-1, 3-3, and 3-5 which have the carrier frequencies $f_1$, $f_3$ and $f_5$, respectively. Each modulated signals are combined in the combiner 4, and are transmitted to a receive side through the output port 6. Similarly, the signal at the input port 5-2-1 is separated to the two signals each having the transmission bit rate B, and are applied to the PSK modulators 3-4 and 3-K each having the carrier frequencies $f_4$ and $f_K$, respectively. Then, the output signals from the modulators are combined, and are transmitted through the output port 6.

Figure 10:
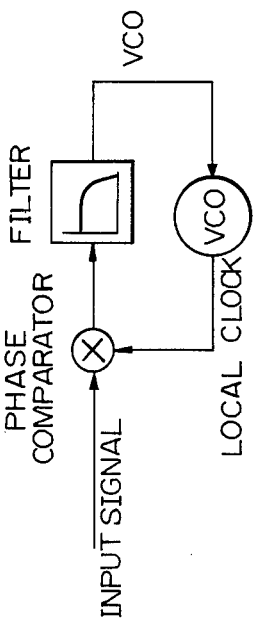
FIG. 10 is a block diagram of a clock regenerative circuit.
Figure 9:
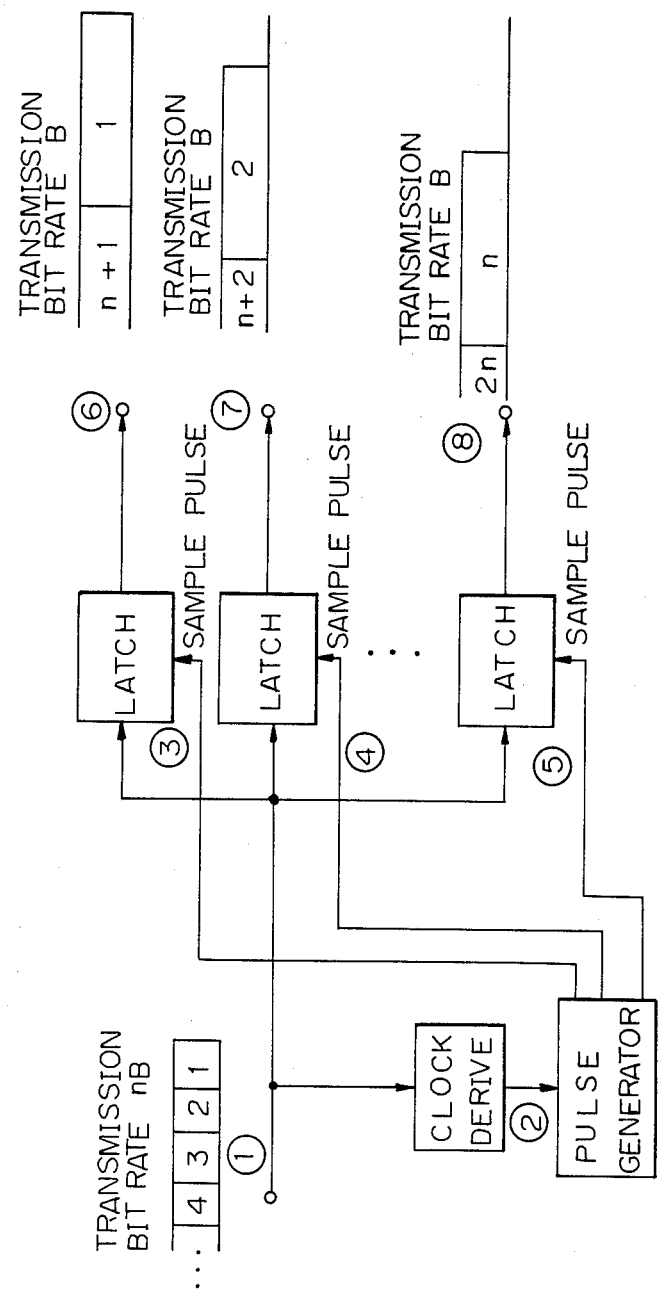
FIG. 9 shows separation of signal with transmission bit rate nB.
Figure 11:
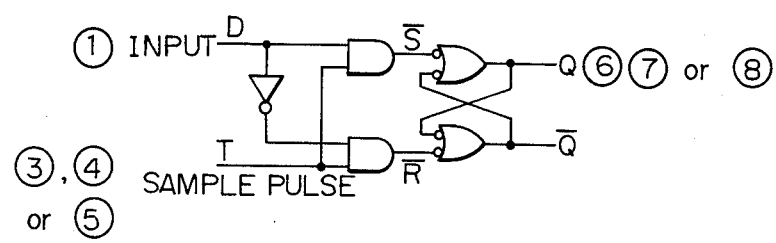
FIG. 11 is a block diagram of a D latch circuit.

FIG. 9 shows a block diagram of a separation circuit which separates a service of the transmission bit rate nB into n channels each having the transmission bit rate B. In the figure, the clock derive circuit regenerates the clock signal of the bit rate nB, and is implemented by the circuit of FIG. 10. A latch cirucit in FIG. 9 is implemented by a D-latch as shown in FIG. 11. A pulse generator in FIG. 9 for providing a sample pulse to a latch circuit is implemented by the combination of a JK flip-flop as shown in FIG. 12 (flip-flops are set and/or reset before the communication).

Figure 13:
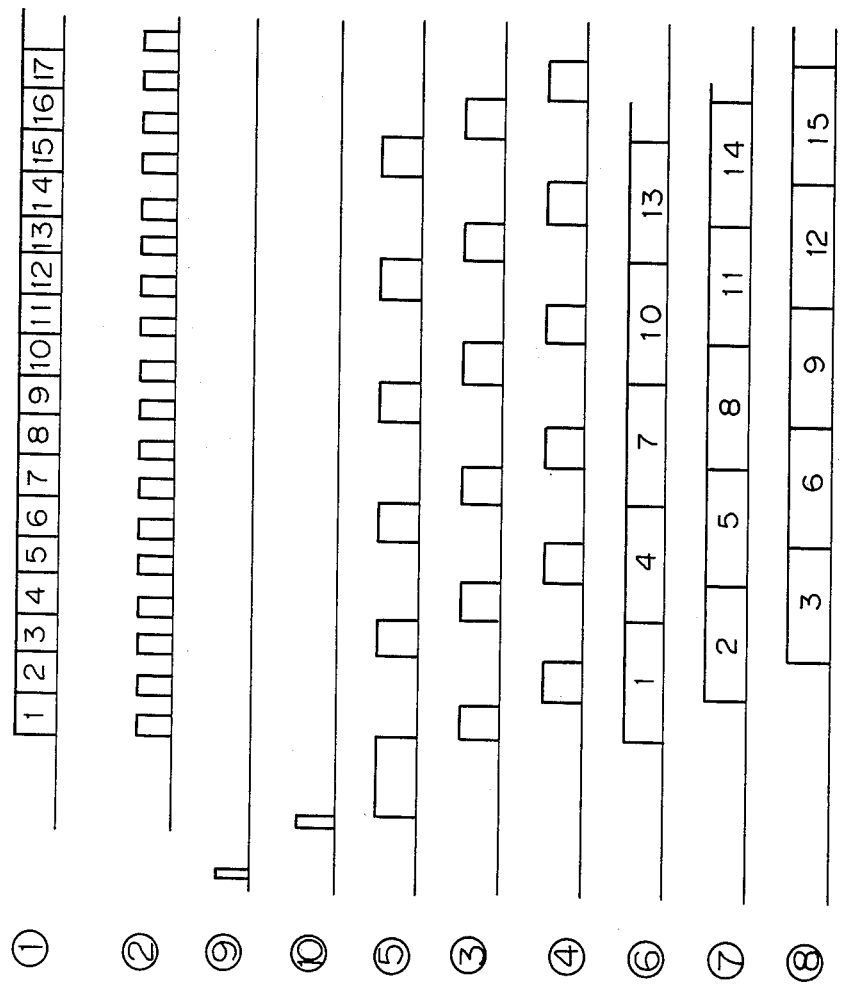
FIG. 13 shows waveform in each portion.

FIG. 13 shows the process, in which the signal of the transmission bit rate 3B is separated to three signals, each having the transmission bit rate B.

Figure 14:
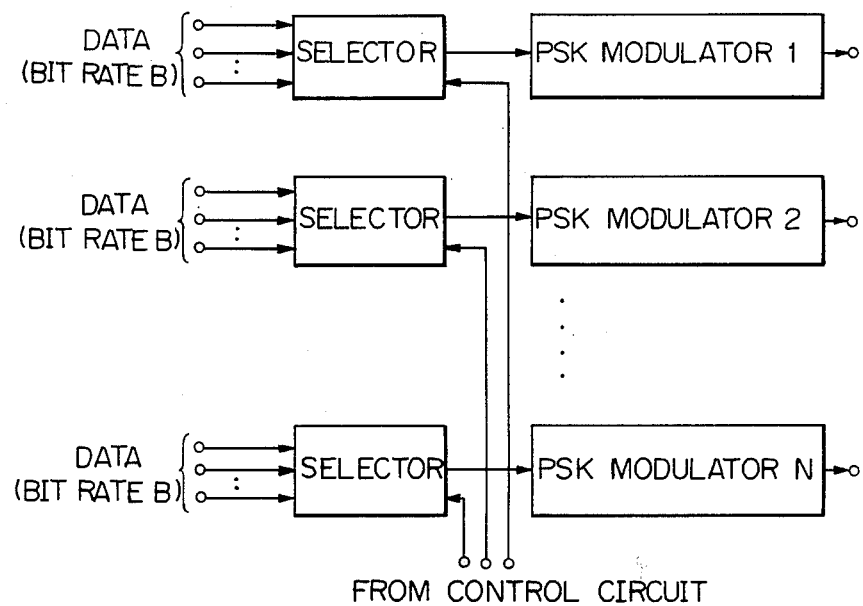

FIG. 14 is a block diagram of a circuit which distributes the signals of the transmission bit rate B to a PSK modulator. A selector in FIG. 14 switches input signals to respective PSK modulators.

Figure 12:
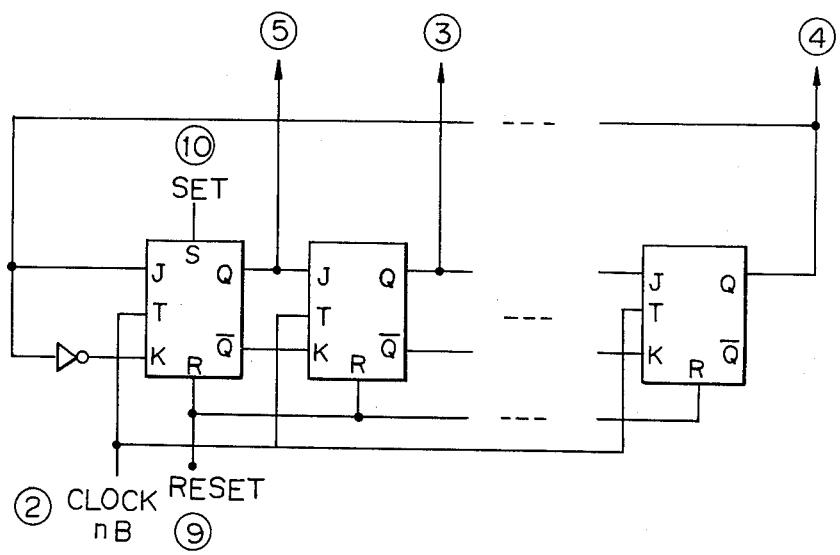
FIG. 12 is a block diagram of a pulse generator.
Figure 15:
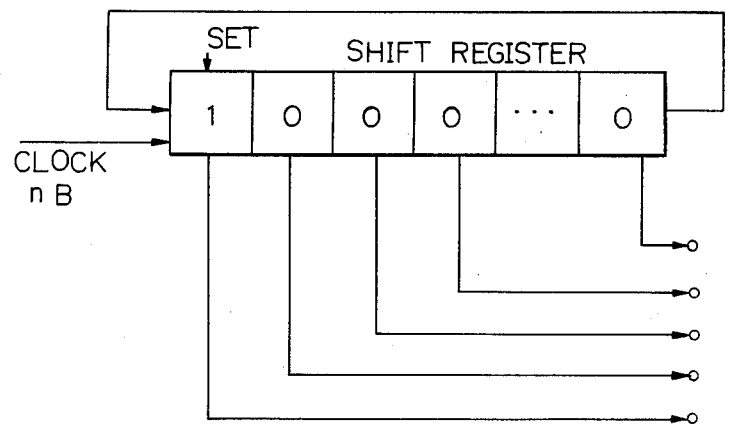
FIG. 15 is a pulse generator using a shift register.

As the operation of the pulse generator in FIG. 12 is the same as that of a shift register, therefore, it may be replaced by the shift register of FIG. 15. If the bit rate of each service is synchronized, a clock regenerative circuit and a pulse generator may be common for each service.

(Embodiment 2 of the receive side)

Figure 16:
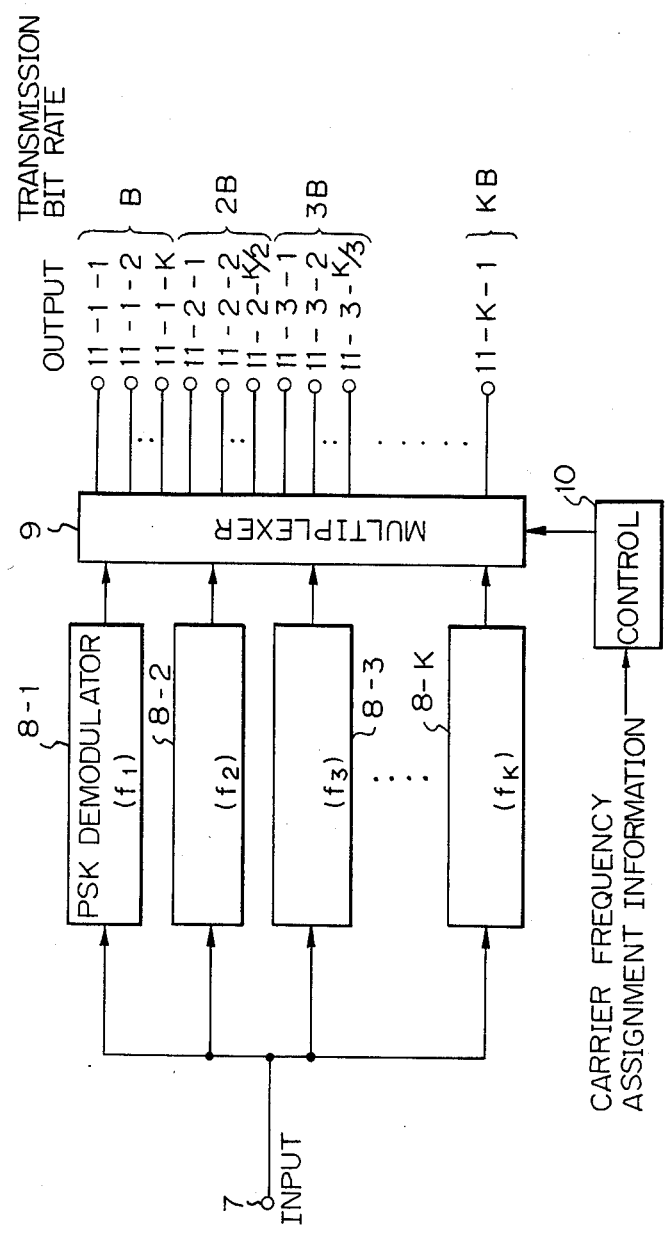
FIG. 16 is a first embodiment of a receive side.

FIG. 16 is a block diagram of the first embodiment in a receive side which communicates with the transmit side of FIG. 6. In the figure, the numeral 7 is an input port from a transmit side, 8-1 through 8-K are PSK demodulators of the carrier frequencies $f_1$ through $f_K$, respectively, 9 is a multiplexer, 10 is a control circuit for controlling the multiplexer 9 according to the carrier frequency assignment information, 11-1-1 through 11-1-K are output ports of the transmission bit rate B, 11-2-1 through 11-2-K/2 are output ports of the transmission bit rate 2B, and 11-K-1 is an output port of the transmission bit rate KB. All the PSK signals at the input port 7 are demodulated by the PSK demodulators 8-1 through 8-K. For the service #1, the control circuit 10 controls the multiplexer 9 to select the signals (FIGS. 8b, 8c and 8d) with the transmission bit rate B from the PSK demodulators 8-1, 8-3 and 8-5 having the carrier frequencies $f_1$, $f_3$ and $f_5$, and the signal of the transmission bit rate 3B (FIG. 8a) is obtained through multiplexing. The multiplexed signal with the bit rate 3B is applied to the output port 11-3-1. For the service #2, the signals of the bit rate B from the PSK demodulators 8-4 and 8-K are multiplexed in the multiplexer 9, and the multiplexed signal of the bit rate 2B is applied to the output port 11-2-1.

Figure 17:
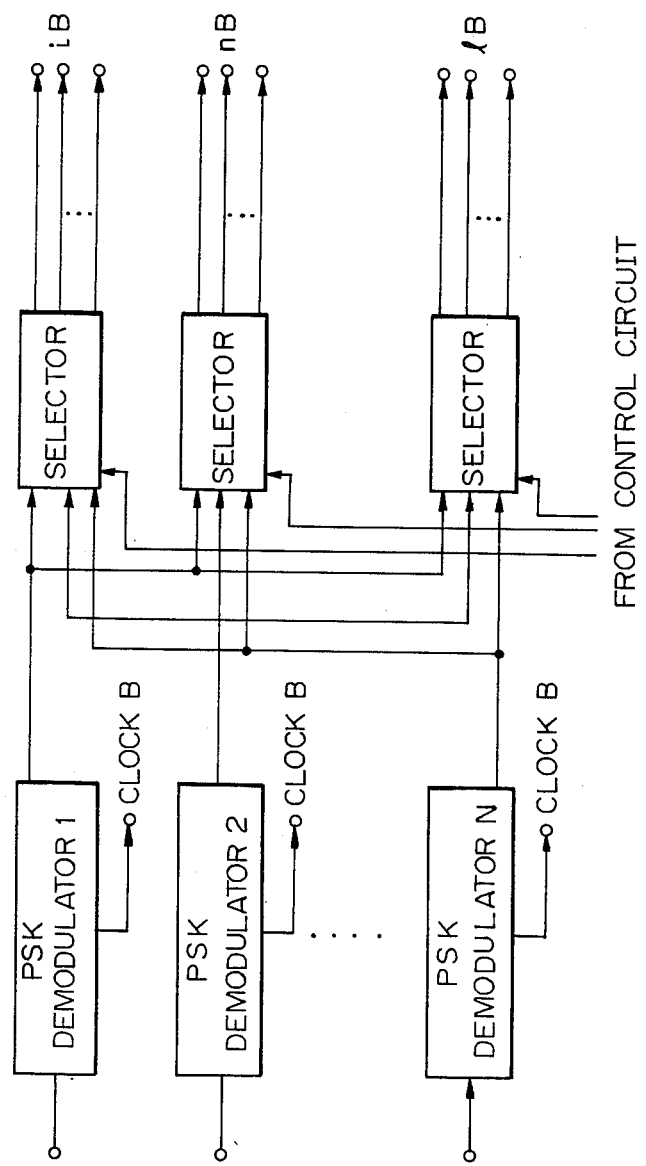
FIG. 17 is a block diagram for selecting output signals of transmission bit rate B from PSK demodulators.

The multiplexer 9 operates in the manner opposite to the separation circuit in the transmit side. FIG. 17 shows the multiplexer in which a selector selects one or plurality of output signals from the PSK demodulators. For example, for the service of the bit rate nB, the selector selects n output signals from the PSK demodulators.

Figure 18:
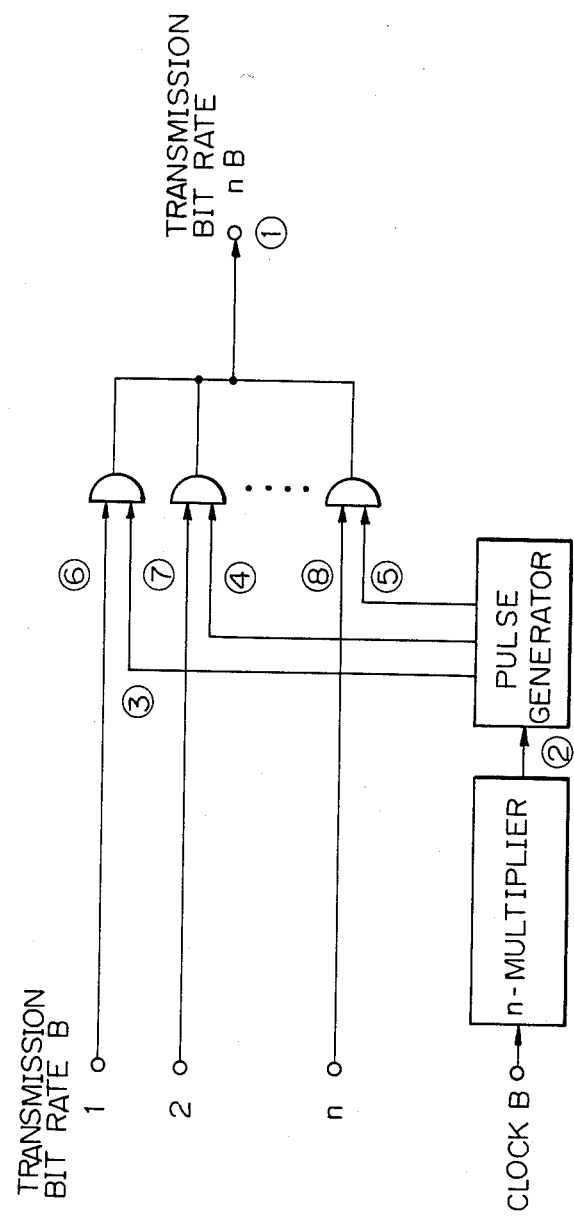
FIG. 18A is a block diagram of a signal multiplexer.
FIG. 18B is a block diagram for selecting output signals and output clock signals from PSK demodulators.

FIG. 18A shows a circuit for converting n signals of the bit rate B to a single signal of the bit rate nB. The pulse generator in FIG. 18A may be that of FIG. 12 or FIG. 15. The outputs from the pulse generator select the signal of the bit rate B, and the selected signals of the bit rate B are simply combined. In FIG. 18A, the signals through the points expressed by the circled symbol are the same as those in FIG. 13. The clock signal to FIG. 18A may either be a regenerated clock in the clock recovery circuit of one PSK demodulator among n PSK demodulators for n signals of the bit rate B, or the clock signal derived directly from one signal among n signals of the bit rate B.

The above embodiment uses the single clock signal to each service for multiplexing. As a modification, all clock signals which are regenerated in respective PSK demodulators may be used. FIG. 18B shows the case to select the signal of the bit rate B and the clock to provide the signals of the bit rates iB, nB and lB. FIG. 18B differs from FIG. 17 in that the clock is also selected in the selector.

Figure 19:
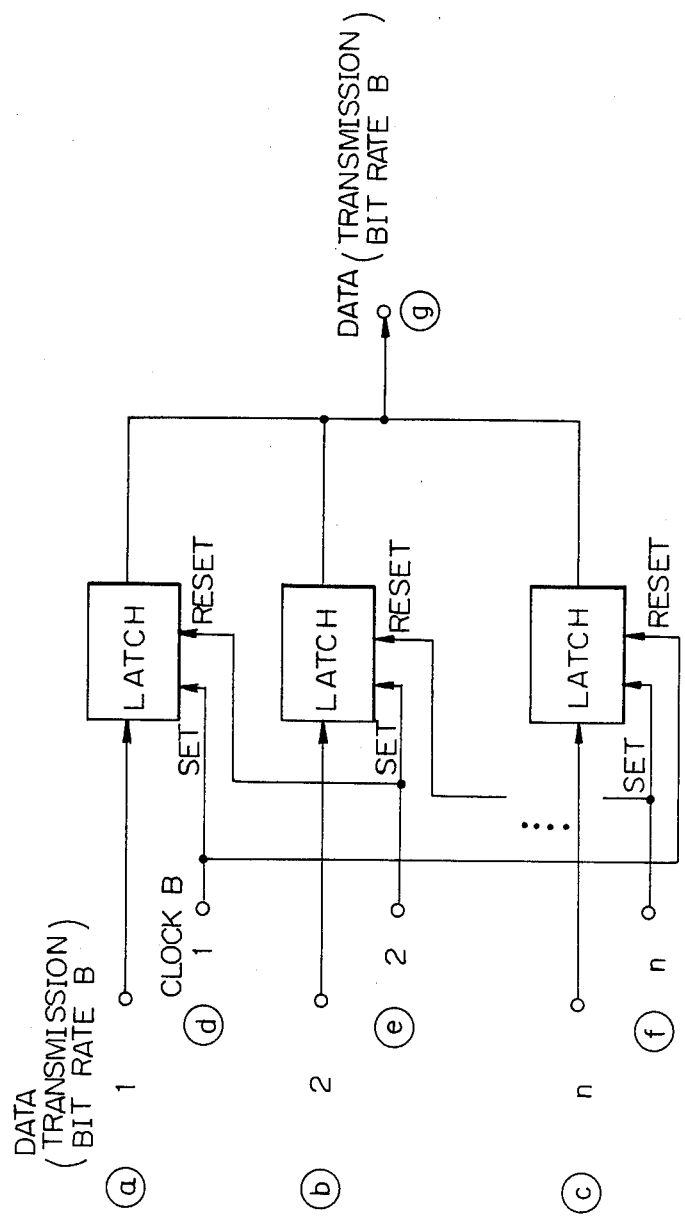
FIG. 19 is a block diagram of a signal multiplexer.

FIG. 19 shows the circuit for multiplexing, having a latch circuit. The latch is set by the input timing of the signal supplied from the particular PSK demodulator, and that latch is reset by the input timing of the next signal supplied from the other next PSK demodulator.

Figure 20:
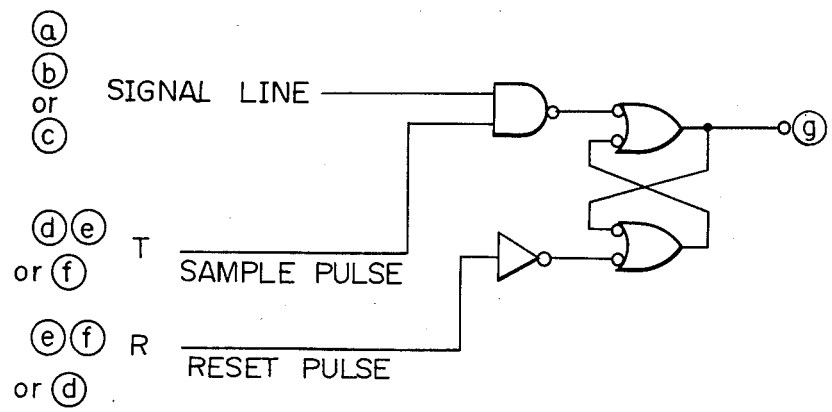
FIG. 20 and FIG. 21 are block diagrams of a latch circuit.
Figure 21:
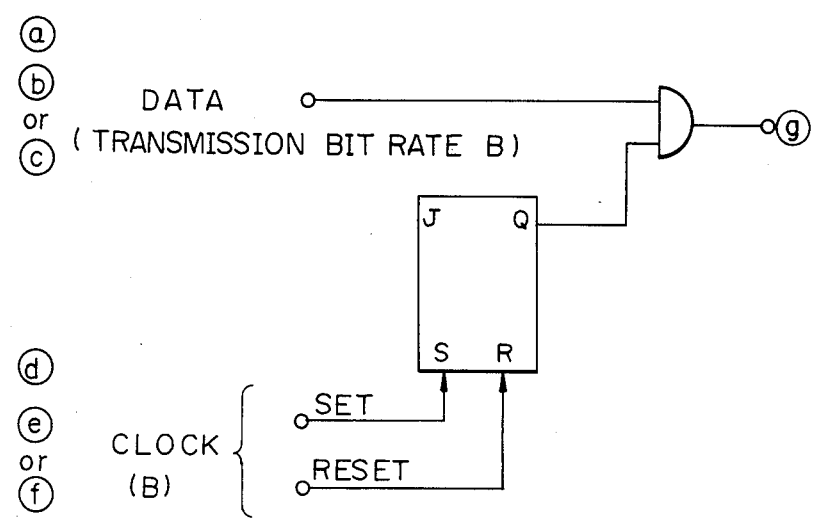
Figure 22:
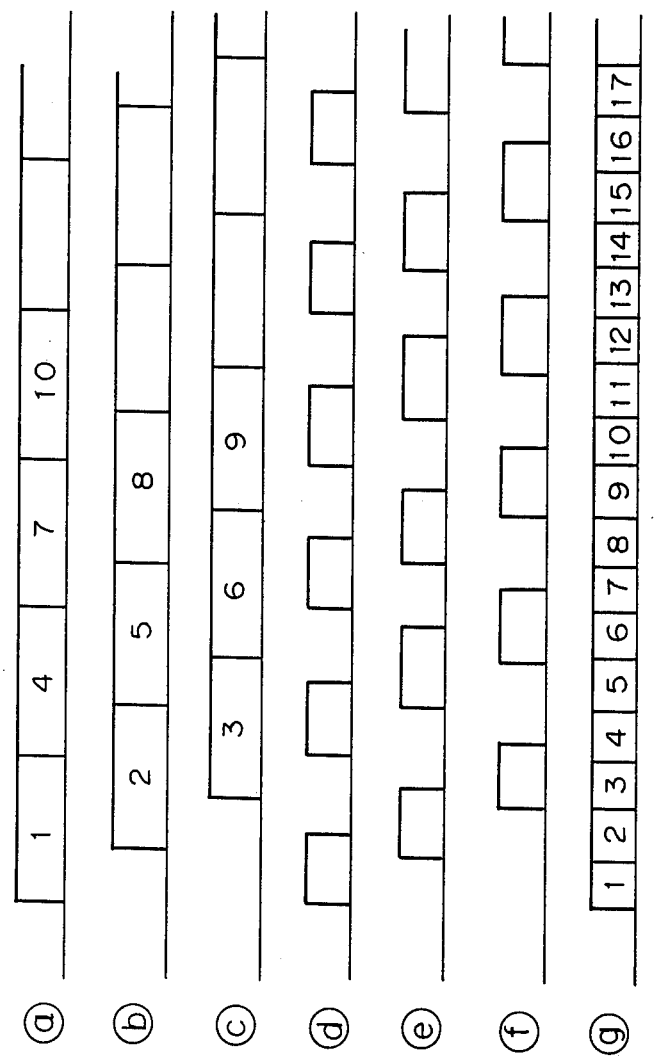
FIG. 22 shows waveform in each portion.

FIGS. 20 and 21 are embodiments of a latch circuit, which uses a gate circuit. The waveforms of each portion for obtaining the signal of the bit rate 3B are shown in FIG. 22.

The present embodiment (both in transmit side and in receive side) uses a plurality of PSK modulators (or PSK demodulators) each having a fixed carrier frequency, and the PSK demodulators relating to the designated ones are used. Therefore, a plurality of modulators (or demodulators) equal to the number of the designated carrier frequencies are necessary. Those plurality of PSK modulators or PSK demodulators may be replaced by a SSK group modulator or a PSK group demodulator, which can handle a plurality of carrier frequencies simultaneously.

(Embodiment 2 of the transmit side)

Figure 23:
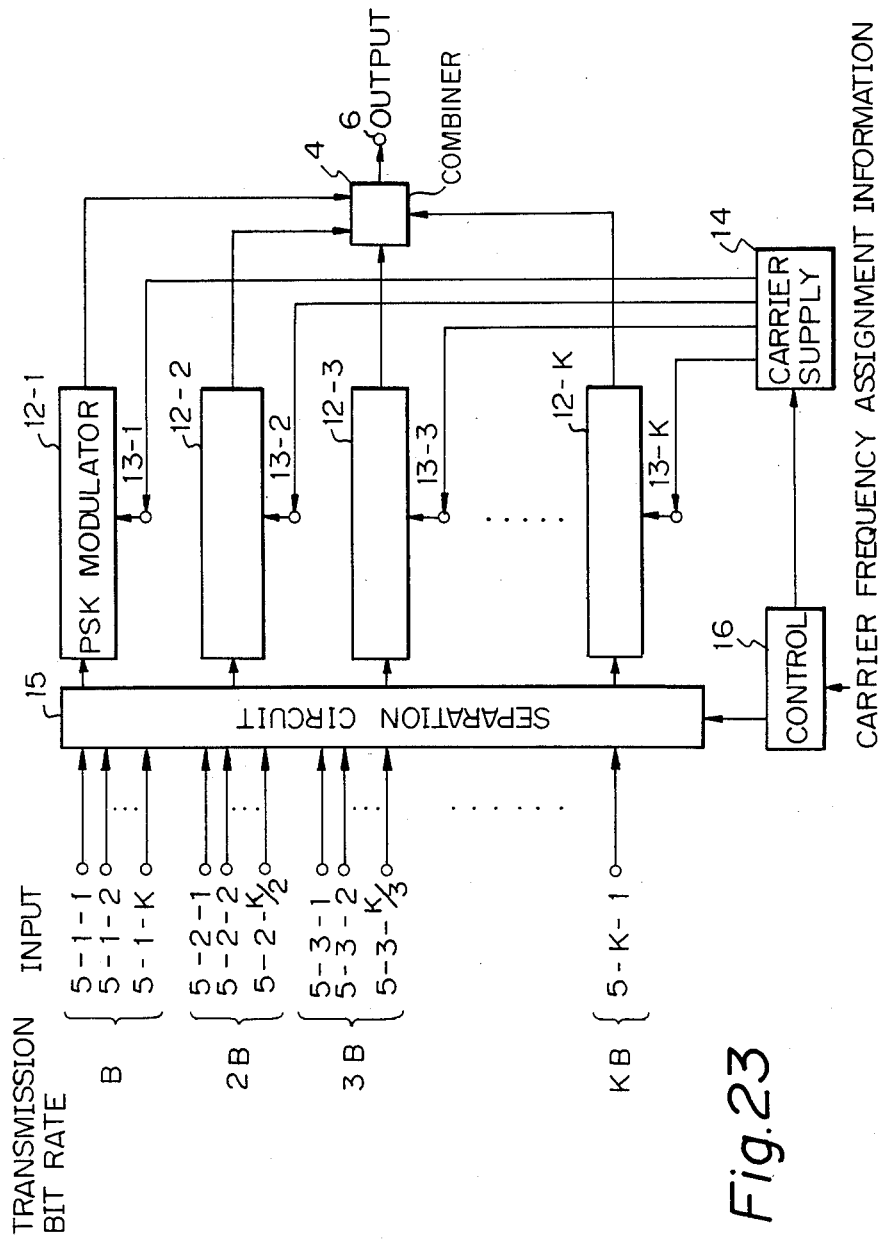
FIG. 23 is a second embodiment of a transmit side.

The second embodiment of the transmit side in the present invention is shown in FIG. 23, in which the relation between a carrier frequency and a PSK modulator is not fixed, but a free PSK modulator is selected, and a signal and a carrier frequency are supplied to the selected PSK modulator. In the figure, the numerals 12-1 through 12-K are PSK modulators, 14 is a carrier supply circuit for providing a carrier frequency to each of the PSK modulators 12-1 through 12-K according to the carrier frequency assignment information, 15 a separation circuit for dividing the service into a plurality of signals with the bit rate B, and supplying each to the designated PSK modulator.

As the carrier frequencies to respective PSK modulators are switched in the second embodiment, the number of required PSK modulators depends upon the total transmission bit rate, and that number is smaller than that of the first embodiment. For instance, it is assumed that $L_1$ services of the bit rate B, $L_2$ services of the bit rate 2B, and $L_3$ services of the bit rate 3B are provided. In this case, the necessary number of the PSK modulators in the second embodiment is smaller than that in the first embodiment by $[K-(L_1+2L_2+3L_3)]$, where K is the number of the carrier frequencies.

(Embodiment 2 of the receive side)

Figure 26:
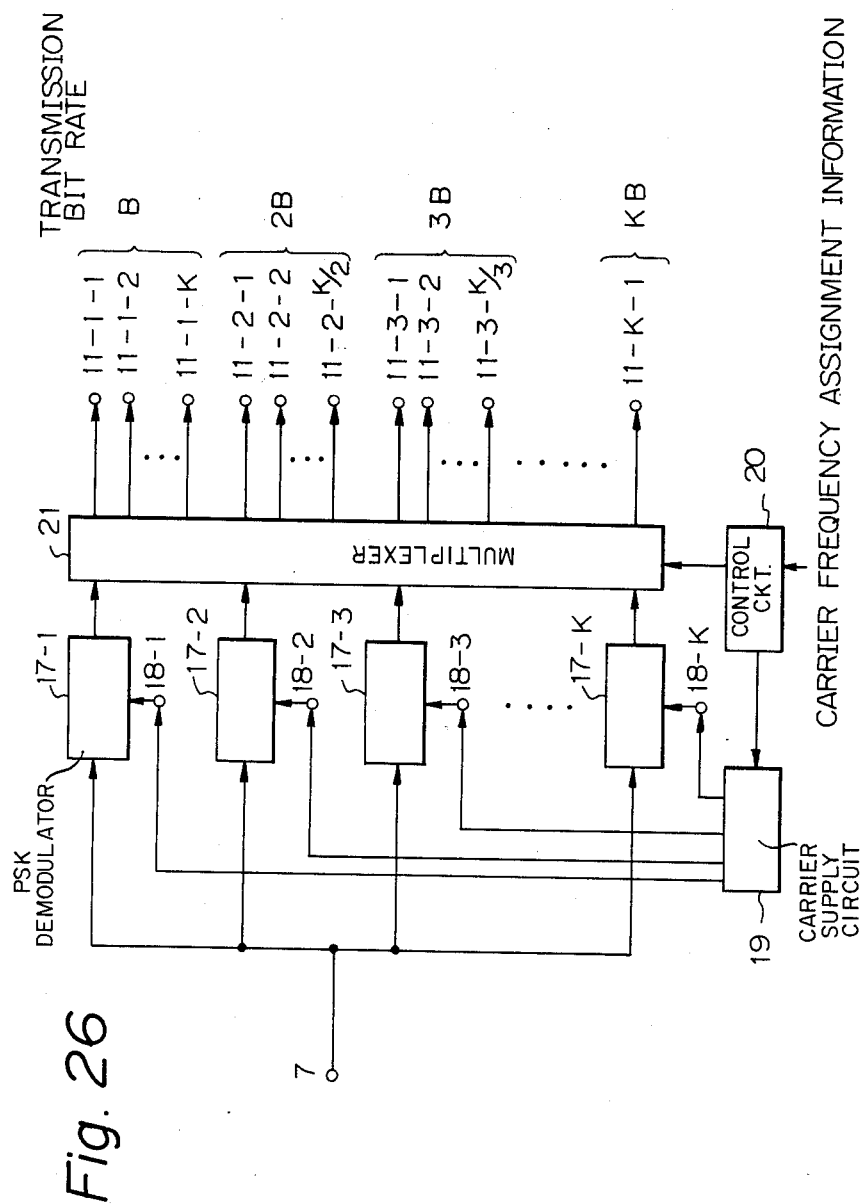
FIG. 26 is a second embodiment of a receive side.

FIG. 26 is a block diagram of a receive side which relates to the second embodiment of FIG. 23. In FIG. 26, the numerals 17-1 through 17-K are PSK demodulators which operate with the carrier frequencies from the input ports 18-1 through 18-K, respectively, 19 is a carrier supply circuit for supplying carrier frequencies to respective PSK demodulators according to the carrier frequency assignment information, 21 is a multiplexer which takes divided signals of the bit rate B and multiplexes them to the high bit rate signal, and 20 is a control circuit for controlling the multiplexer 21 according to the carrier frequency assignment information. The feature of FIG. 26 is the same as that of FIG. 23, and the carrier frequencies to the PSK demodulators 17-1 through 17-K are switched. So, the number of PSK demodulators in FIG. 26 can be smaller than that of the first embodiment.

Now, the deduction of a PSK demodulator in a receive side is described.

First, the first embodiment is considered. A PSK demodulator is implemented either by a coherent detection type, or a differential detection type.

FIG. 24 is a block diagram of a coherent detection type PSK demodulator. In the figure, the numeral 28 is an input port of PSK signal, 29 is an output port of the demodulated signal, 22 is a bandpass filter, 23 is a carrier recovery circuit, 24 is a detection circuit, 25 is a low-pass filter, 26 is a clock recovery circuit, and 27 is a decision circuit.

FIG. 25 is a block diagram of a differential detection type PSK demodulator. The feature of FIG. 25 is the use of one symbol delay circuit 30, instead of the carrier recovery circuit 23 of FIG. 24.

The following embodiment uses a single carrier recovery circuit 23 and a single clock recovery circuit 26 of FIG. 24 commonly to all PSK demodulators relating to each service, and/or uses a single clock recovery circuit 26 of FIG. 25 commonly to all PSK demodulators relating to each service. The common use of those members is possible, since the relations between the phase of the carrier frequency and the phase of the clock signal are constant in each bit rate B as those signals are sent from the same transmit side.

(Embodiment 3 of the receive side)

Figure 27:
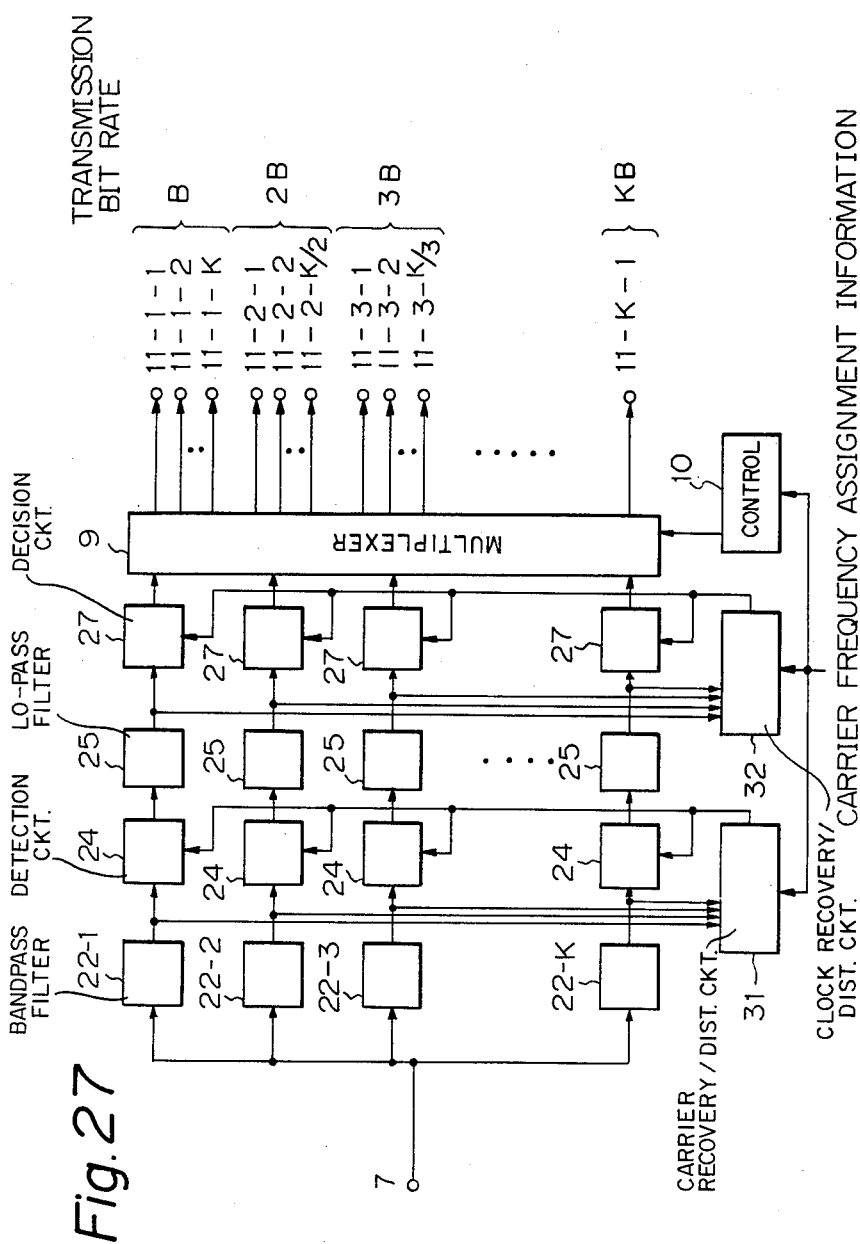
FIG. 27 is a third embodiment of a receive side.

FIG. 27 is a block diagram of the third embodiment of the receive side in which a coherent detection is used. In FIG. 27, the numeral 31 is a carrier recovery/distribution circuit which recovers the reference carrier signal from the output signal of the bandpass filter 22-i according to the carrier frequency assignment information, and supplies the recovered reference carrier signal to the designated detection circuit 24, and 32 is a clock recovery/distribution circuit which recovers a clock signal at the decision timing, and supplies it. In the embodiment of FIG. 27, the circuits 31 and 32 are enough for providing a single set of reference carrier signal and clock signal of the bit rate B for each service, and therefore, a number of set of the circuits 31 and 32 is equal to the number of required services. Thus, the hardware size is reduced.

(Embodiment 4 of the receive side)

Figure 28:
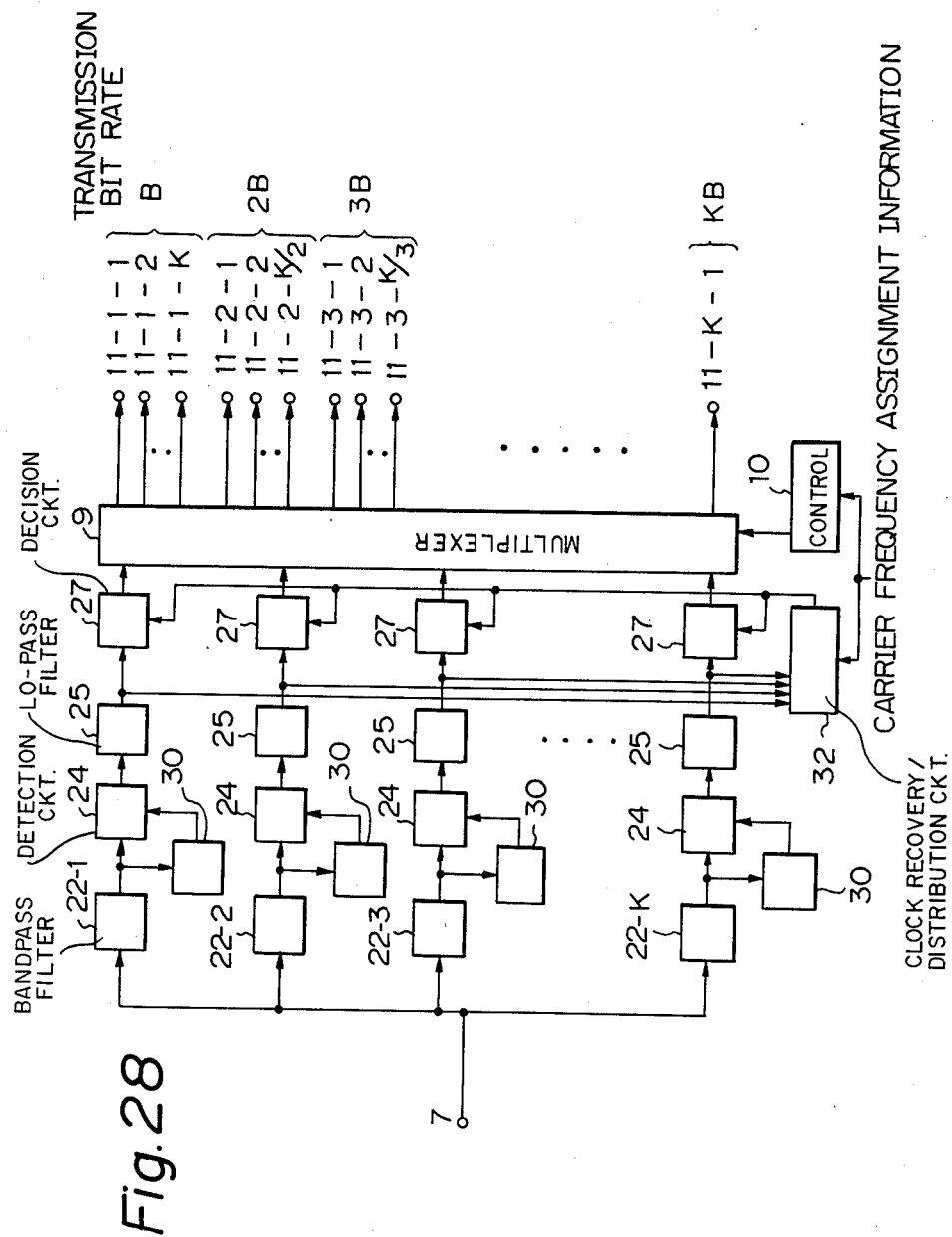
FIG. 28 is a fourth embodiment of a receive side, FIGS. 29(a), (b), (c), and (d) show separation of signal with transmission bit rate 3B to signals with transmission bit rate B.
Figure 29:
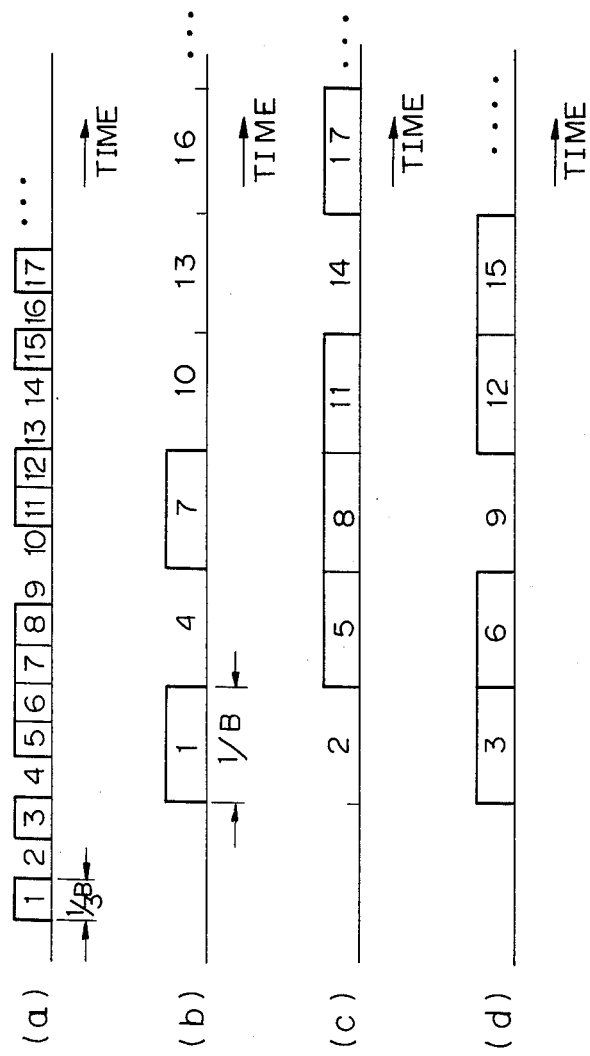

FIG. 28 shows the fourth embodiment of a receive side in which a differential detection is used. In FIG. 28, the circuit 32 for commonly using the recovered clock signal is used, and other portions are the same as those of FIG. 27.

Figure 8:
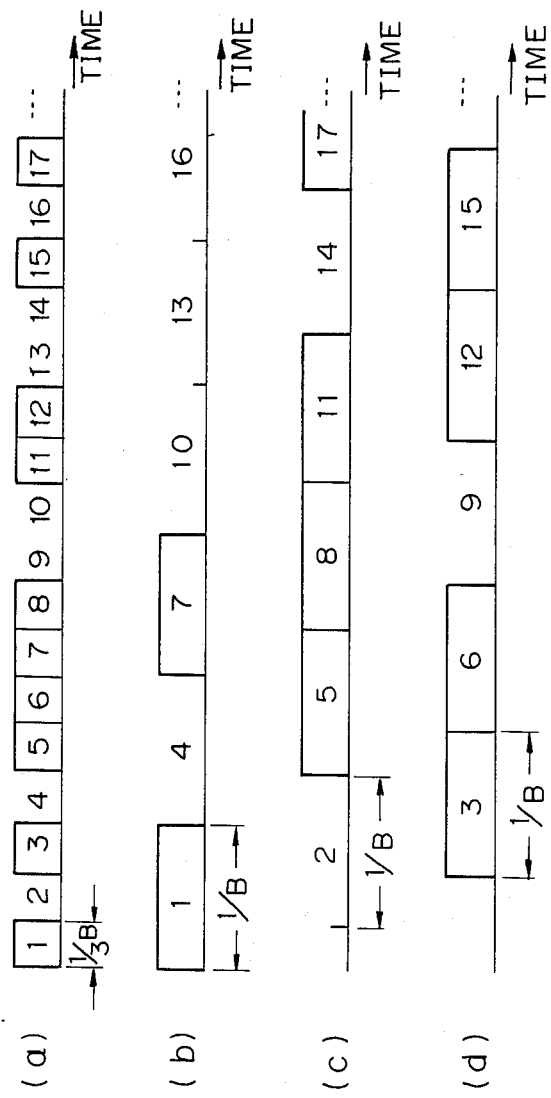

In order to use the recovered reference carrier and clock signals commonly for each service, a transmit side must conform with a receive side. As for a clock recovery the phase of each separated signal with the bit rate B is shifted by a predetermined value in the separation circuit 1 in the embodiment 1 of FIG. 6, and therefore, the clock recovery/distribution circuit 32 in the receive side must consider that value. For instance, in case of FIG. 8 in which the service of the bit rate 3B is handled, when the clock signal is recovered from the signal of FIG. 8b in the receive side, the phase shift of the signals of FIG. 8c and FIG. 8d is ⅓B and ⅔B, respectively comparing to the signal of FIG. 8b. Therefore, the clock recovery/distribution circuit 32 operates based upon said phase shift. Alternatively, when the separation circuit 1 in the transmit side coincides the clock phases of signals with the bit rate B for each service, the clock recovery/distribution circuit 32 in the receive side does not need to consider said phase shift, and it is possible to apply a recovered clock obtained from the particular signal directly to other signals.

(Embodiments 3 and 4 of the transit side)

Figure 30:
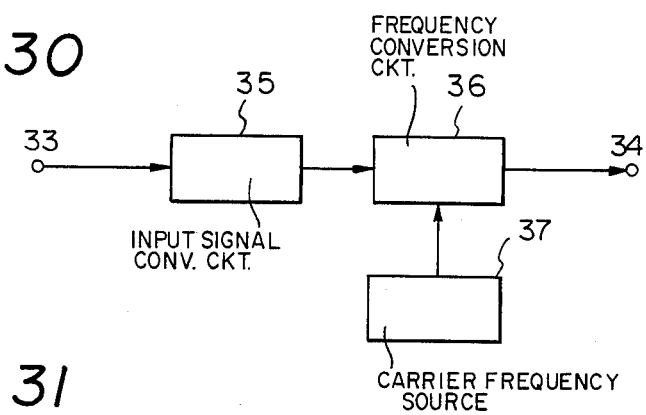
FIG. 30 is a block diagram of a PSK modulator.

When a carrier recovery circuit is commonly used, the structure of a PSK modulator must be considered. FIG. 30 is a block diagram of a PSK modulator, in which the numeral 33 and 34 are input port and output port, respectively, 35 is an input signal conversion circuit, 36 is a frequency conversion circuit, and 37 is a carrier frequency source. The input signal conversion circuit 35 divides an input signal to a plurality of signals according to the number of phases of the PSK modulation. For instance, in case of 4 phase PSK signal, the number of divided signals is two. The carrier frequency source 37 generates carrie frequencies, with a plurality of phases depending upon the number of phases of the PSK modulation. For instance, in case of 4 phases PSK modulation, 2 carrier signals having the phase difference by 180°. The frequency conversion circuit 36 makes the multiplication between the signal from the carrier frequency source 37 and the output signal from the input signal conversion circuit 35. The above PSK modulator is used whether the receive side uses a coherent detection or a differential detection.

When a PSK modulator of FIG. 30 is used for each input signal of the bit rate B independently, the phase of the carrier signal depends upon the source, and therefore the reference carrier signal recovered in the receive side can not be used commonly.

If all the PSK modulators operate at the reference carrier signals which are generated by the single frequency source, the common use of the carrier signal in the receive side is possible.

Figure 31:
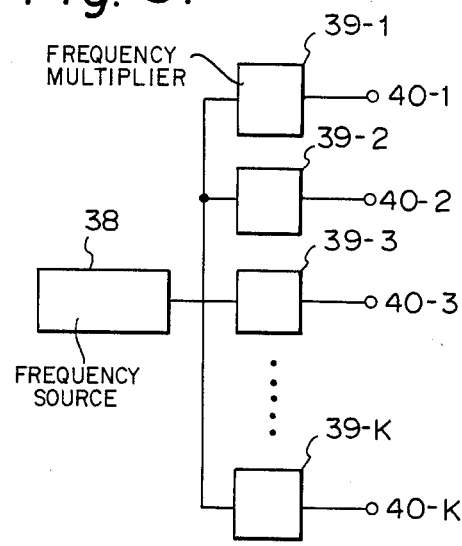
FIG. 31 is a block diagram of a carrier signal generator.

FIG. 31 is a block diagram for generation of carrier signals. In the figure, the numeral 38 is a frequency source which provides the frequency $f_0$, 39-1 through 39-K are frequency multipliers for multiplying the input frequency by integer for providing the carrier frequencies $f_1$ through $f_K$, 40-1 through 40-K are output ports for sending carrier frequencies $f_1$ through $f_K$, respectively.

The embodiments 1 and 2 of the transmit side including the circuit of FIG. 31 are called the third and fourth embodiments of the transmit side, respectively here.

When the ratio of the fundamental frequency $f_0$ of the frequency source 38 to the carrier frequencies $f_1$ through $f_K$ is $R_1$ through $R_K$, and the output signal $s_0(t)$ of the generator 38 is;

$$S_0(t) = \sin(2\pi f_0 t) \tag{1}$$

the signals $S_1(t)$ through $S_K(t)$ at the outputs 40-1 through 40-K are as follows.

$$\begin{aligned} S_1(t) &= \sin(2\pi R_1 f_0 t) \\ S_2(t) &= \sin(2\pi R_2 f_0 t) \\ &\vdots \\ S_K(t) &= \sin(2\pi R_K f_0 t) \end{aligned} \tag{2}$$

As described before, a plurality of signals which have the fixed phase difference with one another are output from each of the circuits 40-1 through 40-K other than the signals of the equation (2), depending upon the number of phases of the PSK modulation.

The common use of the reference carrier frequency recovered in the first embodiment of a receive side is now described.

Figure 32:
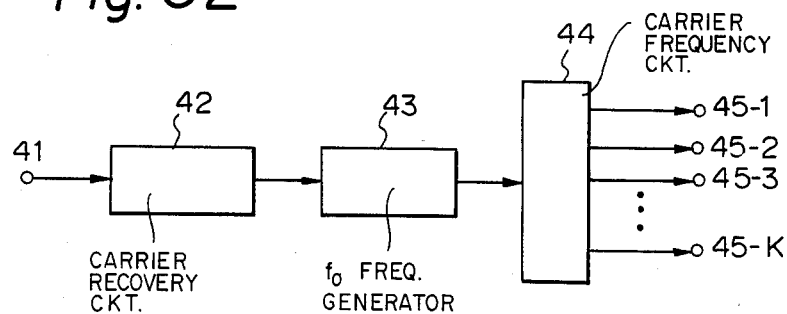
FIG. 32 is a block diagram of a carrier recovery supply circuit.

FIG. 32 shows the carrier recovery/distribution circuit 31, in which the numeral 41 is an input port from a bandpass filter 22-i in the PSK demodulator i which is to recover the reference carrier frequency, 42 is a carrier recovery circuit, 43 is a circuit for generating the same fundamental frequency $f_0$ as that of the frequency source 38 in the transmit side, 44 is a circuit for providing carrier frequencies for operating a plurality of PSK demodulators corresponding to each service, and 45-1 through 45-K are output ports of the carrier frequencies. The circuit 44 which provides a plurality of carrier frequencies has a frequency multiplier as is the case in the transmit side.

It is assumed that the service #2 in FIG. 1 (the transmission bit rate is 3B having the carrier frequencies $f_1$, $f_3$ and $f_5$) is transmitted from the transmit side, and in the receive side, the first PSK demodulator having the carrier frequency $f_1$ provides other carrier frequencies $f_3$ and $f_5$. The frequency $f_1$ is provided at the output port of the bandpass filter 22-1 in FIG. 27. The output $S'_1(\tau)$ from the carrier recovery circuit 42 is given by the following equation.

$$S_1'(\tau) = \sin(2\pi f_1 \tau) \qquad (3)$$
$$= \sin(2\pi R_1 f_0 \tau)$$

where $(\tau)$ is a time variable which is introduced because the reference time at the receive side differs from that at the transmit side.

The output $S'_0(\tau)$ from the circuit 43 having the frequency $f_0$ which is the same as that in the frequency source 38 in the transmit side is as follows.

$$S_0'(\tau) = \sin(2\pi f_0 \tau) \qquad (4)$$

The carrier signals $S_3'(\tau)$ and $S_5'(\tau)$ of the frequencies $f_3$ and $f_5$ generated by said $S_0'(\tau)$ are as follows.

$$S_3'(\tau) = \sin(2\pi R_3 f_0 \tau)$$
$$S_5'(\tau) = \sin(2\pi R_5 f_0 \tau) \qquad (5)$$

In comparing the equations (3) and (5) which show the recovered carrier signal in the receive side with the equation (2) which shows the carrier frequency in the transmit side, the phase of the frequencies $f_1$, $f_3$ and $f_5$ in the receive side coincides completely with that of the transmit side.

As described above, the recovered reference carrier and clock signals for a PSK demodulator in a receive side can be used commonly for each service. Thus, the configuration can be simplified. The common use of the above signals is possible when a plurality of carrier signals for PSK modulators in a transmit side are generated from a single frequency source. When a plurality of PSK signals are modulated by a PSK group modulator, no particular consideration is necessary, because said PSK group modulator operates inherently with a single carrier frequency. Similarly, when a plurality of PSK signals are demodulated by means of a PSK group demodulator in a receive side, the common use is possible as the recoveries of the reference carrier and clock signals are basically performed for each channel.

(Embodiment 5 of the receive side)

Next, the common use of the recovered reference carrier and clock signals in a receive side in the second embodiment is described. As it is clear that the common use of the clock signal is possible similar to the above description, no further description is necessary. However, in the second embodiment, since each PSK modulator operates with a carrier frequency which is provided from an external circuit, as shown in FIG. 23. The direct use of a PSK demodulator in FIG. 24 or FIG. 25 is impossible, because a bandpass filter can not operate for any arbitrary frequency. If a variable bandpass filter having adjustable pass band is used, the use of FIG. 24 or FIG. 25 is possible, of course.

Figure 33:
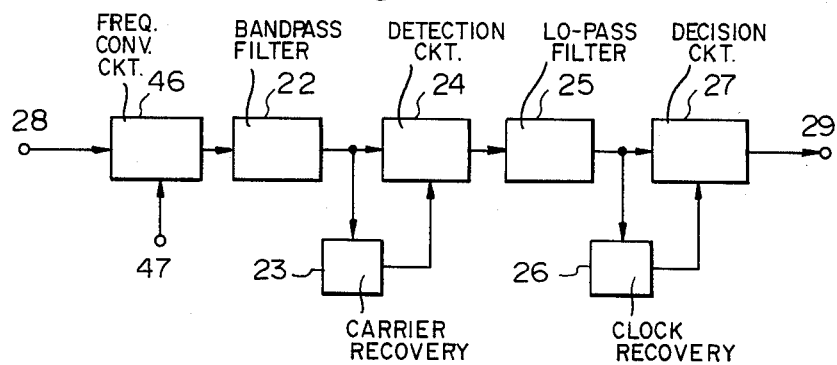
FIG. 33 is a block diagram of a PSK demodulator in INTELSAT SPADE system.
Figure 34:
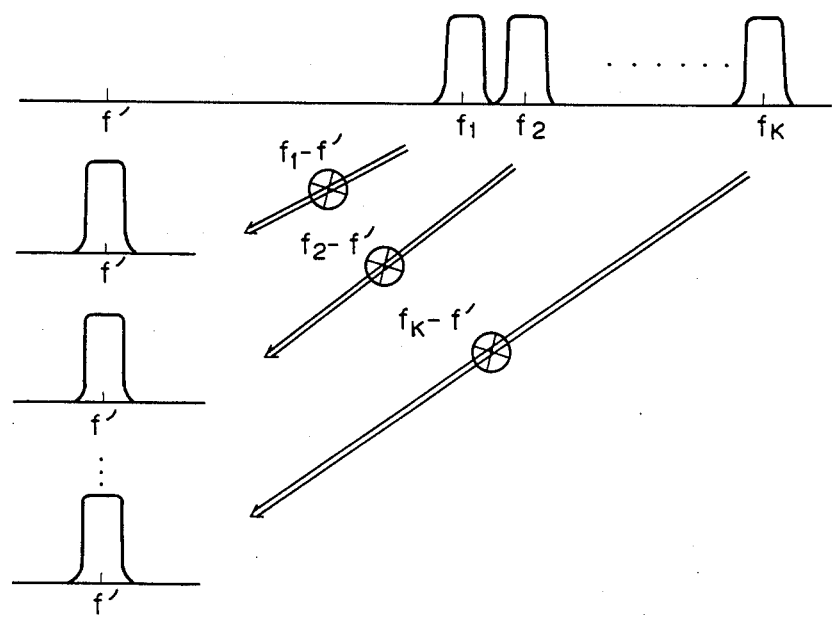
FIG. 34 shows frequency conversion at receive side in INTELSAT SPADE system.

FIG. 33 is a block diagram of a prior PSK demodulator used in the INTELSAT SPADE system. In FIG. 33, the sinusoidal signal which corresponds to the carrier frequency of a PSK demodulator is applied to an input port 47, and the passband of the bandpass filter 22 of all the PSK demodulators is coincided by the frequeny converter circuit 46. As shown in FIG. 34, the frequency difference between the carrier frequencies $f_1$ through $f_K$, and the predetermined frequency $f'$ is multiplied to each PSK signal in the frequency converter circuit 46, so that the intermediate frequency of the PSK signals applied to the bandpass filter 22 becomes the predetermined frequency $f'$. FIG. 35A shows the structure for common use of the recovered reference carrier signal for each service when the above PSK demodulation is performed. In FIG. 35A, the numeral 48 is a circuit for generating a sinusoidal signals having the frequency difference components to operate the particular PSK demodulator, in the intermediate frequency $f'$, 49 is a circuit for recovering a reference carrier signal for the particular PSK demodulator, 50 is a circuit for generating sinusoidal signals having freqency difference components for converting input signals to PSK demodulators which do not recover a reference carrier signal, into an intermediate frequency, 51-1 through 51-K are switches for selecting either sinusoidal signal from the frequency source 48, or sinusoidal signal generated by the circuit 50. In operation, it is assumed that the service #2 (FIG. 7) having the transmission bit rate 3B and the carrier frequencies $f_1$, $f_3$ and $f_5$ are transmitted from the transmit side, and only the carrier frequency $f_1$ is used to recover a reference carrier signal in the receive side.

The frequency conversion circuit 46 in the PSK demodulator having the carrier frequency $f_1$ receives the sinusoidal signal from the frequency source 48 as shown in the following equation.

$$Y_1(\tau) = \sin[2\pi(f_1 - f')\tau + \phi] \qquad (6)$$

where $\phi$ is the phase difference which is introduced because the phase of the frequency source 38 in the transmit side does not completely coincide with the phase of the frequency source 48 in the receive side. The output signal $X_1(\tau)$ from the frequency converter circuit 46 is changed to the intermediate frequency band $f'$ as shown in the equation (7) by said frequency conversion.

$$X_1(\tau) = a_1(\tau)\sin(2\pi f'\tau - \phi) \qquad (7)$$

where $a_1(\tau)$ is a signal of the transmission bit rate B from the transmit side. The reference carrier signal $Y_1'(\tau)$ recovered by the circuit 49 is shown below.

$$Y_1'(\tau) = \sin(2\pi f'\tau - \phi) \tag{8}$$

The sinusoidal signals having the frequency differences ($f_3-f'$ and $f_5-f'$) for operating the frequency converter circuits 46 relating to the carrier frequencies $f_3$ and $f_5$ are generated by the sinusoidal signal generator 50. Those signals are expressed by the following equations.

$$Y''_3(\tau) = \sin[2\pi(f_3-f')\tau - (f_3-f')\phi/f']$$

$$Y''_5(\tau) = \sin[2\pi(f_5-f')\tau - (f_5-f')\phi/f'] \tag{9}$$

Therefore, the outputs signals from respective frequency conversion circuits 46 are;

$$X_3(\tau) = a_3(\tau)\sin(2\pi f\tau + (f_3-f')\phi/f')$$

$$X_5(\tau) = a_5(\tau)\sin(2\pi f\tau + (f_5-f')\phi/f') \tag{10}$$

The present embodiment uses the detection circuit 24 by using the recovered reference carrier signal of the equation (8) to those signals. In this case, the phase components have the following errors.

$$\Delta\phi_3 = ((f_3-f')/f' + 1)\phi$$

$$\Delta\phi_5 = ((f_5-f')/f' + 1)\phi \tag{11}$$

The effect by those errors can be overcome by selecting f' to be enough larger than $f_i(i=1$ through K).

(Embodiment 6 of the receive side)

Figure 36:
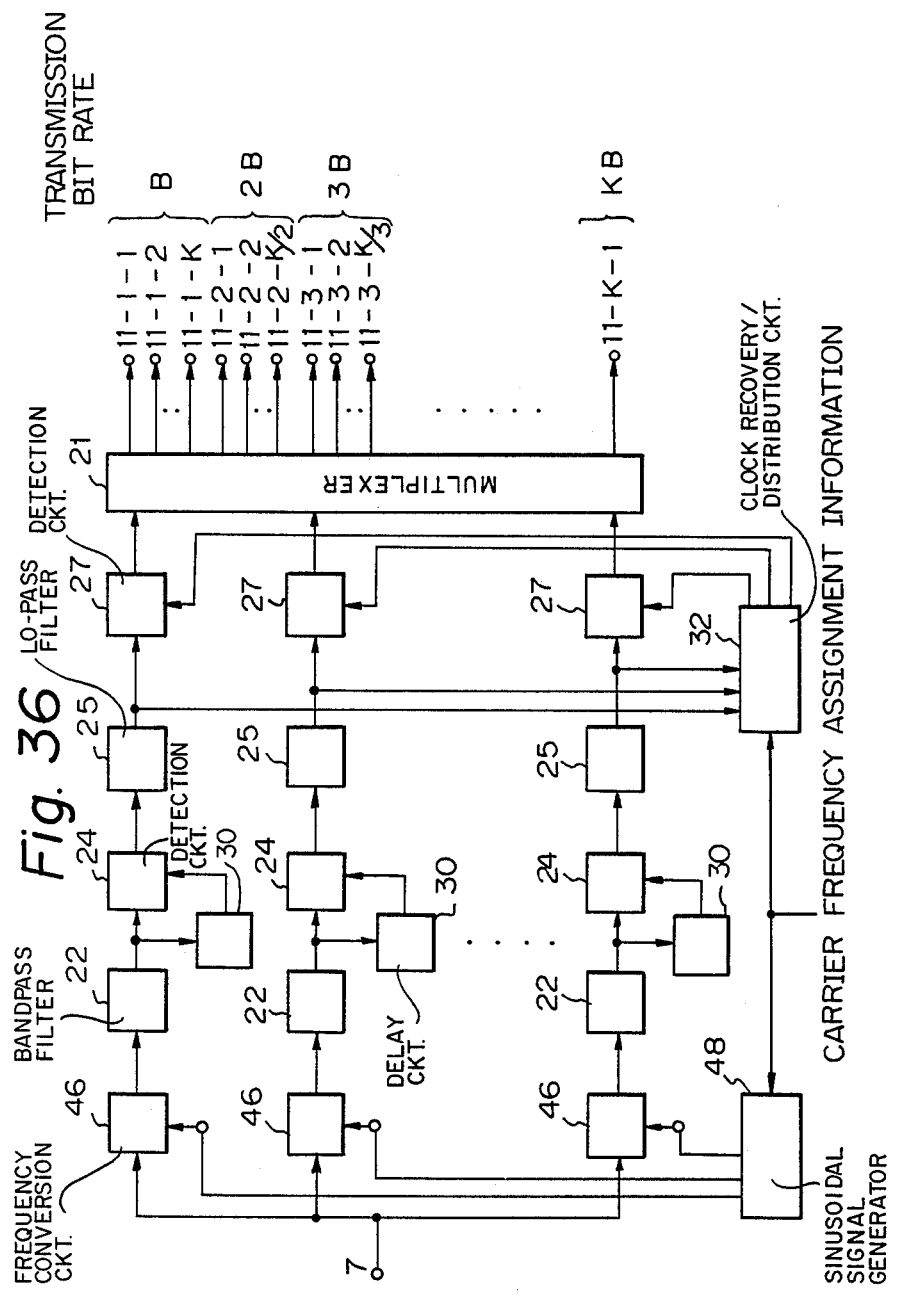

The embodiment of the receive side when a differential detection is used, is shown in FIG. 36, which does not use the common recovered reference carrier signal. Therefore, the circuit 50 in FIG. 35A is not included in FIG. 36.

Figure 35C:
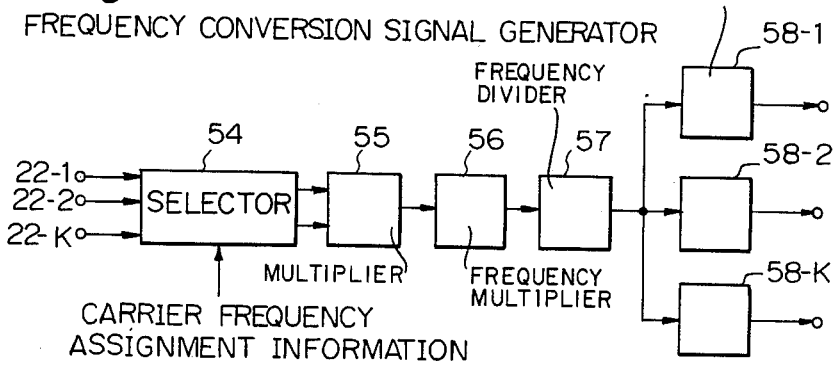
FIG. 35C is a block diagram of frequency conversion signal generator.
Figure 35D:
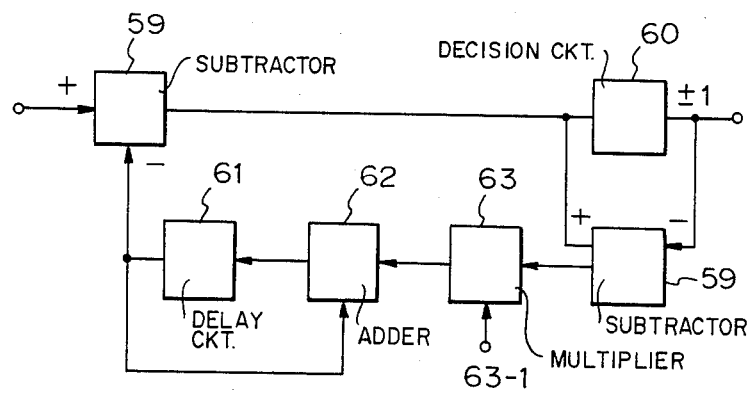
FIG. 35D is a block diagram of phase error correction

A configuration shown in FIG. 35A must be slightly modified when various frequency drifts are occurred on the transmission path. FIG. 35B shows the configuration in that case. Numerals 46 and 22 are the same circuits as those in FIG. 33, and sinusoidal signals which are generated from a single frequency source are supplied to the circuits 46 for converting the PSK signals into the intermediate frequency. In this embodiment, the second frequency converter 52 is required between the bandpass filter 22 and the carrier recovery circuit 24. FIG. 35C shows a block diagram of the circuit 53 which supplies sinusoidal signals to the circuit 52. In FIG. 35C, numeral 54 is a selector to extract at least two signals among a plurality of PSK signals transmitted from the same transmit side, 55 is a multiplier to multiply two signals extracted in the selector 54, 56 is a frequency multiplier to generate a frequency multiplied by the number of phases in the PSK modulation, and 57 is a frequency divider to obtain the fundamental frequency (fo) subject to the frequency drift on the transmission path. Numerals 58-1 through 58-K are the same circuits as those 39-1 through 39-K in the transmit side of FIG. 31, which generates sinusoidal signals to convert respective PSK signals into the intermediate frequency. In this configuration, since constant phase errors are caused in the signals except the two signals extracted in the selector 54 after the multiplication of the recovered reference carrier signal, the decision circuit 27 must be modified into a block diagram shown in FIG. 35D, which has a first order feed-back loop for correcting the phase error. In FIG. 35D, numeral 59 is a subtracter, 60 is a decision circuit, 61 is a one-symbol delay circuit, 62 is an adder and 63 is a multiplier for achieving a correction of phase errors gradually by receiving a value less than 1 from the input port 63-1.

FIG. 37 shows the possible combination of the embodiments of a transmit side and the embodiments of a receive side. The following observations can be obtained from FIG. 37.

(1) The embodiments 1 and 2 of the transmit side in which each PSK signal is processed individually can communicate with the embodiments 1, 2, 4 and 6 in which a recovered reference carrier signal is not used commonly.

(2) As the relation among clocks of respective signals reating to each service is fixed in a transmit side, the common use of a recovered clock signal in a receive side is possible when coherent and differential detections are used in a receive side.

(3) When carrier signals relating to each service are provided by a single common source in a transmit side, the common use of a recovered reference carrier signal is possible when a coherent detection is used in a receive side.

(4) when each PSK signal is demodulated individually in a receive side, a transmit side may provide a carrier frequency either from a single common source, or from different sources.

Finally, the particular effects of the present invention are summarized.

(1) Either INTELSAT SCPC system (Single Channel Per Carrier), or the PSK group MODEM which modulates and demodulates a plurality of PSK signals simultaneously can be directly used as the PSK modem in the embodiment 1. A modem in the embodiment 2 is completely the same as that in the INTELSAT SPADE system. A transmit side and a receive side are required to have a separation means for dividing each service and a multiplexing means for multiplexing each service according to the carrier frequency assignment information, respectively.

(2) The clock phases of the signals of each service are fixed in a transmit side in separating each service to channels with the constant bit rate. Therefore, a receive side may use the recovered clock in common for each service.

(3) If a transmit side generates various carrier signals from a single frequency source, a receive side can use the recovered reference carrier signal in common for each service.

Although the above description assumes the fixed transmission bit rate B of each PSK signal, it is not restricted to the fixed bit rate so long as the transmission bit rate of each carrier frequency is predetermined.

As described above in detail, the feature of the present invention is that each service is transmitted by several PSK signals after separation process based upon the transmission bit rate of each service.

According to the present invention, a communication system unique to each transmission bit rate corresponding to each service is not necessary, and therefore, the communication system can conform with the change of traffic. Further, as all the services can be transmitted by means of a single configuration, the hardware size can be reduced.

From the foregoing, it will now be apparent that a new and improved frequency assignment system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A transmitter/receiver system in a frequency division multiple access communication system which assigns a necessary number of frequencies, each having a predetermined transmission band, said transmitter/receiver system comprising:
   a transmitter including,
   (a) a separation circuit which divides an input service into a plurality of low bit rate signal series to utilize small, unused frequency bands, each signal series being transmitted by one of said predetermined transmission bands, based upon carrier frequency assignment information when a transmission bit rate of said input service is higher than a transmission capability of said predetermined transmission band and when one frequency band large enough for transmitting an input service is not available at the instant of receiving said input service,
   (b) a plurality of PSK modulators for modulating each output of said separation circuit, and
   (c) a combiner for combining outputs of all the PSK modulators to provide a transmission output signal through a single transmission line; and
   a receiver including,
   (a) a plurality of PSK demodulators for effecting PSK demodulation for each signal transmitted from a transmitter,
   (b) a multiplexer coupled with outputs of said demodulators for multiplexing said divided signal series into a high bit rate service according to said carrier frequency assignment information.

2. A transmitter/receiver system according to claim 1, wherein each of a number of PSK modulators, and a number of PSK demodulators is less than a number of said carrier frequencies.

3. A transmitter/receiver system according to claim 1, in which said transmitter obtains a plurality of carrier frequencies which are used for PSK modulation, from a single frequency source.

4. A transmitter/receiver system according to claim 1, wherein said receiver regenerates at least a single clock signal from a PSK modulated, divided signal for each service, and said single clock signal is used for demodulating other divided signals in said service.

5. A transmitter/receiver system according to claim 1, wherein said receiver regenerates at least a single reference carrier frequency from a PSK modulated, divided signal, and said single reference frequency is used as frequency source for demodulating other PSK modulated, divided signals.

* * * * *